(12) United States Patent
Hausman, Jr. et al.

(10) Patent No.: US 10,310,540 B2
(45) Date of Patent: Jun. 4, 2019

(54) METHOD AND APPARATUS FOR PHASE-CONTROLLING A LOAD

(71) Applicant: LUTRON ELECTRONICS CO., INC., Coopersburg, PA (US)

(72) Inventors: Donald F. Hausman, Jr., New Tripoli, PA (US); Robert C. Newman, Jr., Emmaus, PA (US); Christopher J. Salvestrini, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 15/279,536

(22) Filed: Sep. 29, 2016

(65) Prior Publication Data

US 2017/0017254 A1    Jan. 19, 2017

Related U.S. Application Data

(62) Division of application No. 13/801,522, filed on Mar. 13, 2013, now Pat. No. 9,489,005.
(Continued)

(51) Int. Cl.
*H05B 37/02* (2006.01)
*H05B 33/08* (2006.01)
(Continued)

(52) U.S. Cl.
CPC .............. *G05F 5/00* (2013.01); *H02M 5/297* (2013.01); *H05B 33/0809* (2013.01);
(Continued)

(58) Field of Classification Search
CPC ........................... H05B 37/02; H05B 33/0815; H05B 33/0845; H05B 41/36; H05B 41/38; H05B 41/3921; H05B 41/3924
(Continued)

(56) References Cited

U.S. PATENT DOCUMENTS 5,004,969 A    4/1991  Schanin
5,038,081 A    8/1991  Maiale, Jr. et al.
(Continued)

FOREIGN PATENT DOCUMENTS

CN    1068237 A    1/1993
CN    101959346 A    1/2011
(Continued)

*Primary Examiner* — Thai Pham
(74) *Attorney, Agent, or Firm* — Glen R. Farbanish; Amy E. Yanek; Philip N. Smith

(57) ABSTRACT

A load control device may control the amount of power provided to an electrical load utilizing a phase control signal that operates in a reverse phase control mode, a center phase control mode, and a forward phase control mode. A load control device may be configured to determine that the electrical load should be operated via a phase control signal operating in a forward phase-control mode. After determining to operate the electrical load via the phase control signal in the forward phase-control mode, the load control device may provide the phase control signal in a reverse phase-control mode for a predetermined period of time to the electrical load, for example, to charge a bus capacitor of the electrical load. Subsequently, the load control device may be configured to switch the phase control signal to the forward phase-control mode and provide the phase control signal in the forward phase-control mode to the electrical load.

23 Claims, 13 Drawing Sheets

Related U.S. Application Data

(60) Provisional application No. 61/616,460, filed on Mar. 28, 2012.

(51) Int. Cl.
*H05B 39/04* (2006.01)
*G05F 5/00* (2006.01)
*H02M 5/297* (2006.01)

(52) U.S. Cl.
CPC ....... *H05B 33/0815* (2013.01); *H05B 39/048* (2013.01); *Y02B 20/346* (2013.01)

(58) Field of Classification Search
USPC ... 315/194, 209 R, 246, 287, 291, 294, 297, 315/307, 308, 312
See application file for complete search history.

(56) References Cited

U.S. PATENT DOCUMENTS

| | | | |
|---|---|---|---|
| 5,175,477 A | 12/1992 | Grissom | |
| 5,239,255 A * | 8/1993 | Schanin | G05F 1/455 323/237 |
| 5,424,618 A | 6/1995 | Bertenshaw et al. | |
| 5,510,679 A | 4/1996 | Maiale, Jr. et al. | |
| 5,600,233 A | 2/1997 | Warren et al. | |
| 5,629,607 A | 5/1997 | Callahan et al. | |
| 5,672,941 A | 9/1997 | Callahan et al. | |
| 5,821,703 A | 10/1998 | Callahan et al. | |
| 6,346,778 B1 | 2/2002 | Mason et al. | |
| 6,466,456 B2 | 10/2002 | Sauerlaender et al. | |
| 6,538,346 B2 | 3/2003 | Pidutti et al. | |
| 6,813,720 B2 | 11/2004 | Leblanc | |
| 7,190,124 B2 | 3/2007 | Kumar et al. | |
| 7,190,125 B2 | 3/2007 | McDonough et al. | |
| 7,259,524 B2 | 8/2007 | Hausman, Jr. et al. | |
| 7,619,365 B2 | 11/2009 | Davis et al. | |
| 8,085,009 B2 | 12/2011 | Lumsden | |
| 8,085,160 B2 | 12/2011 | Vanderzon | |
| 8,120,307 B2 | 2/2012 | Lumsden | |
| 8,208,235 B2 | 6/2012 | Orchowski | |
| 8,242,714 B2 | 8/2012 | Weightman et al. | |
| 8,253,394 B2 | 8/2012 | Hirst | |
| 9,084,352 B2 | 7/2015 | Shinmura et al. | |
| 2001/0014949 A1 | 8/2001 | Leblanc | |
| 2005/0285576 A1 | 12/2005 | Achart et al. | |
| 2007/0126368 A1 | 6/2007 | McDonough et al. | |
| 2007/0216375 A1 | 9/2007 | Achart et al. | |
| 2008/0067954 A1 | 3/2008 | Black et al. | |
| 2008/0246414 A1 | 10/2008 | Xu et al. | |
| 2008/0284350 A1 | 11/2008 | Xu et al. | |
| 2008/0315787 A1 | 12/2008 | Xu | |
| 2009/0096384 A1 | 4/2009 | Vanderzon | |
| 2009/0096625 A1 | 4/2009 | Vanderzon | |
| 2009/0130223 A1 | 5/2009 | Breitenbach et al. | |
| 2009/0284182 A1 | 11/2009 | Cencur | |
| 2010/0327778 A1 | 12/2010 | Schanin et al. | |
| 2011/0012530 A1 | 1/2011 | Zheng et al. | |
| 2011/0121744 A1 | 5/2011 | Salvestrini et al. | |
| 2011/0121752 A1 | 5/2011 | Newman, Jr. | |
| 2011/0121812 A1 | 5/2011 | Salvestrini | |
| 2012/0033471 A1 | 2/2012 | Newman, Jr. | |
| 2012/0049749 A1 | 3/2012 | Pearlman et al. | |
| 2012/0230073 A1 | 9/2012 | Newman, Jr. et al. | |

FOREIGN PATENT DOCUMENTS

| | | |
|---|---|---|
| EP | 618667 A1 | 10/1994 |
| EP | 923274 A2 | 6/1999 |
| FR | 2856236 A1 | 12/2004 |
| WO | WO 1992/015052 A1 | 9/1992 |
| WO | WO 2007/042598 A1 | 4/2007 |
| WO | WO 2007/068040 A1 | 6/2007 |

\* cited by examiner

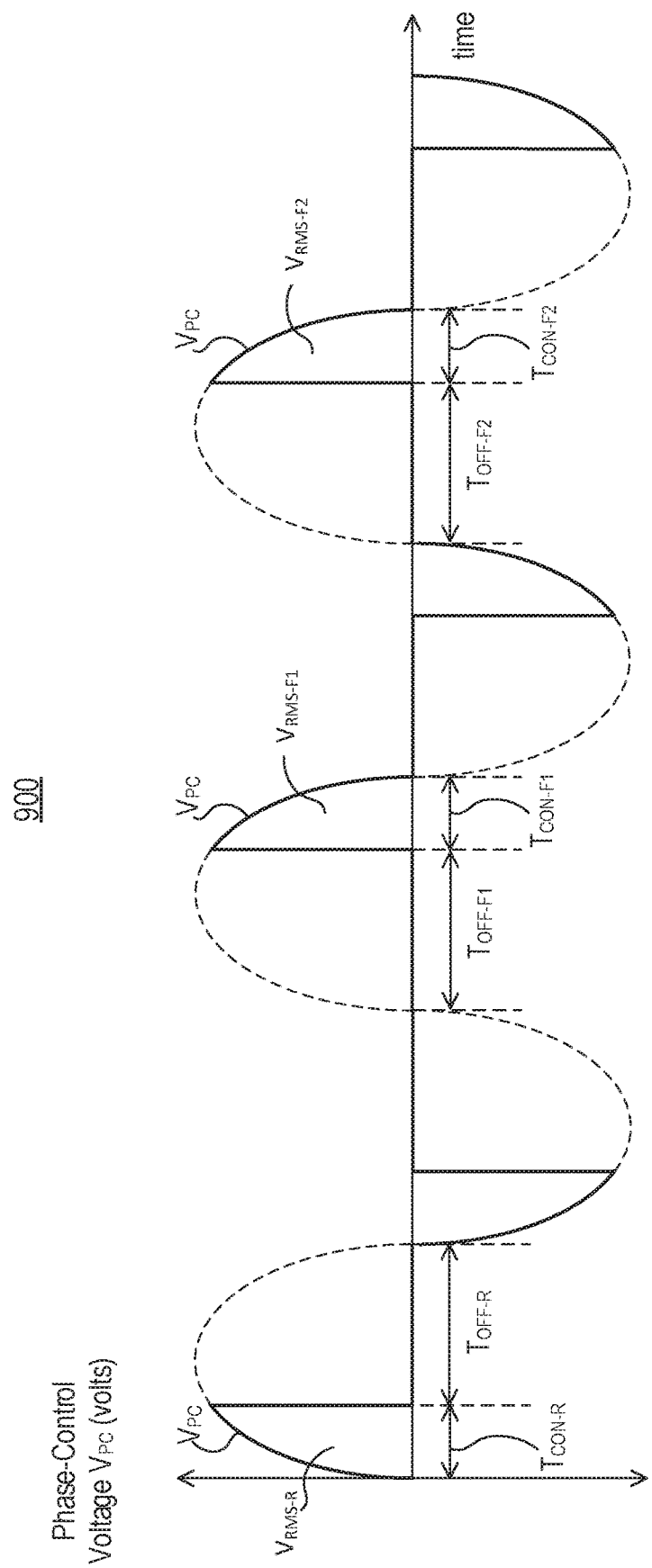

METHOD AND APPARATUS FOR PHASE-CONTROLLING A LOAD

CROSS-REFERENCE TO RELATED APPLICATIONS

This application is a divisional of U.S. patent application Ser. No. 13/801,522, filed Mar. 13, 2013, now U.S. Pat. No. 9,489,005, issued Nov. 8, 2016, which claims the benefit of Provisional U.S. Patent Application No. 61/616,460, filed Mar. 28, 2012, the disclosure of which is hereby incorporated herein by reference.

BACKGROUND

Load control devices, such as dimmer switches and dimming modules, for example, may be configured to control an amount of power provided from an alternating current (AC) power source to a load, such as a lighting load, for example. Such load control devices may employ a bidirectional semiconductor switch that is coupled in series electrical connection between the AC power source and the load. The bidirectional semiconductor switch may be controlled to be conductive and non-conductive for portions of a half-cycle of the AC power source, for example, to control the amount of power delivered to the load (e.g., using a phase-control dimming technique). For example, the bidirectional semiconductor switch may comprise one semiconductor switch, such as, but not limited to a triac or a field effect transistor (FET) within a full-wave rectifying bridge; two semiconductor switches, such as, but not limited to two FETs or two insulated gate bipolar transistors (IGBTs), coupled in anti-series electrical connection, or two silicon-controlled rectifiers (SCRs) coupled in anti-parallel electrical connection.

Load control devices may use a forward phase-control dimming technique or a reverse phase-control dimming technique, for example, to control when the bidirectional semiconductor switch is rendered conductive and non-conductive to control the power delivered to the load. During forward phase-control dimming, the bidirectional semiconductor switch may be turned on at some point within each AC line voltage half-cycle and remains on until the next voltage zero crossing. Forward phase control dimming may be used to control the power delivered to a resistive or inductive load, which may include, for example, an incandescent lamp or a magnetic low-voltage transformer, respectively. During reverse phase-control dimming, the bidirectional semiconductor switch may be turned on at the zero crossing of the AC line voltage and turned off at some point within each half-cycle of the AC line voltage. Reverse phase-control dimming may be used to control the power delivered to a capacitive load, which may include, for example, an electronic low voltage transformer. Given that the bidirectional semiconductor switch may be rendered conductive at the beginning of the half-cycle and may be able to be turned off within the half-cycle, reverse phase control dimming may be utilized by a dimmer switch that includes two FETs in anti-serial connection, or the like.

Load control devices may be programmed by a user during installation to use the reverse phase-control dimming technique or the forward phase-control dimming technique during operation. Alternatively, load control devices may employ a load detection process wherein the load control device may determine the type of load that it is controlling and use the phase-control dimming technique that is best suited for that load type. For example, a load control device may detect that the load is inductive, and may determine to use the forward phase-control dimming technique. For example, upon initial power up, such a load control device may begin using a reverse phase-control dimming technique (e.g., operating in reverse phase-control mode) and may monitor the voltage across the load during the load detection process. In the event that the load control device detects an overvoltage condition (e.g., a voltage spike), the load control device may then determine that the load has inductive characteristics, and may accordingly begin using a forward phase-control dimming technique (e.g., operating in forward phase-control mode). After a load control device determines to employ a phase-control technique (e.g., forward phase-control dimming technique), for example, in response to a load detection process, user programming, or as a result of pre-configuration at the factory), the load control device may continue to use the determined phase-control technique during operation and may not deviate from using the determined phase-control technique.

However, a load control device may achieve improved performance as a result of deviating from a phase-control technique (e.g., a forward phase-control dimming technique) to employ another phase-control technique (e.g., a reverse phase-control dimming technique) during certain conditions. Therefore, there is a need for an improved load control device that is operable to employ one phase-control technique (e.g., a forward phase-control dimming technique) during operation and employ another phase-control technique (e.g., a reverse phase-control dimming technique) during certain conditions.

Further, some electrical loads, such as a compact fluorescent lamp (CFL) or a light emitting diode (LED) lamp, for example, may comprise a capacitor (e.g., a bus capacitor). If the capacitor is not charged, then the use of a forward phase-control diming technique may cause a current spike, which, for example, may occur at start-up when the capacitor is fully dissipated. This current spike may be due to the relatively large change in voltage across the capacitor at a given time (e.g., an instantaneous voltage across the capacitor). However, the load coupled to the load control device may be best suited for a forward phase-control dimming technique. Therefore, there is a need for an improved load control device that may be operable to employ a reverse phase-control dimming technique and/or a center phase control technique to charge the capacitor, and to employ a forward phase-control dimming technique to operate the load.

Additionally, an electrical load, such as a light emitting diode (LED) lamp, for example, may require a certain minimum voltage across it in order to turn on (e.g., emit light). However, once turned on, the load may be able to operate with an even lower voltage (and thus provide a lower light intensity) than is required to turn the lamp on. Therefore, a load control device may be forced to select between operating a load with the lowest possible light output and guaranteeing that the load will turn on when the certain minimum voltage is being applied. Thus, there is a need for an improved load control device that is operable to employ a reverse phase-control technique, a center phase-control technique, and a forward phase-control dimming technique in a single operation, for example, in order to charge a capacitor, provide sufficient voltage across a load to turn it on, and operate the load while allowing it to reach its lowest possible light output (low-end).

SUMMARY

A load control device may control the amount of power provided to a load utilizing a phase control signal that operates in two or more of reverse phase control mode, center phase control mode, and forward phase control mode. For example, a load control device may be configured to control an amount of power delivered from an alternating current (AC) power source to an electrical load. The load control device may include a bidirectional semiconductor switch and a controller. The bidirectional semiconductor switch may be configured to be coupled between the AC power source and the electrical load. The controller may be operatively coupled to the bidirectional semiconductor switch. The controller may be configured to receive a command to turn on. The controller (e.g., in response to the turn-on command) may be configured to control the bidirectional semiconductor switch to provide a first line cycle of a phase control signal using a reverse phase control technique to the electrical load. The controller may be configured to control the bidirectional semiconductor switch to provide a second line cycle of the phase control signal using a center phase control technique to the electrical load. The controller may be configured to control the bidirectional semiconductor switch to provide a third line cycle of the phase control signal using a forward phase control technique to the electrical load. The first line cycle, the second line cycle, and the third line cycle may have substantially the same conduction time and/or may be characterized by the same RMS voltage value.

A load control device may be configured to control an amount of power delivered from an AC power source to an electrical load. The load control device may include a bidirectional semiconductor switch and a controller (e.g., microprocessor). The bidirectional semiconductor switch may be configured to be coupled between the AC power source and the electrical load. The controller may be operatively coupled to the bidirectional semiconductor switch. The controller may be configured to control the bidirectional semiconductor switch using a phase control dimming technique to adjust the amount of power provided to the electrical load. When the electrical load is in an off state, the controller may be operable to first use a reverse phase control dimming technique for a predetermined period of time to control the electrical load to be in the on state, and after the predetermined period of time, the controller may be operable to subsequently use the forward phase control dimming technique to continue to maintain the electrical load in the on state.

BRIEF DESCRIPTION OF THE DRAWINGS

FIG. 9 is a diagram illustrating an example voltage waveform of a dimming procedure comprising a phase control signal that operates in reverse phase control mode and forward phase control mode.

DETAILED DESCRIPTION

Figure 1:
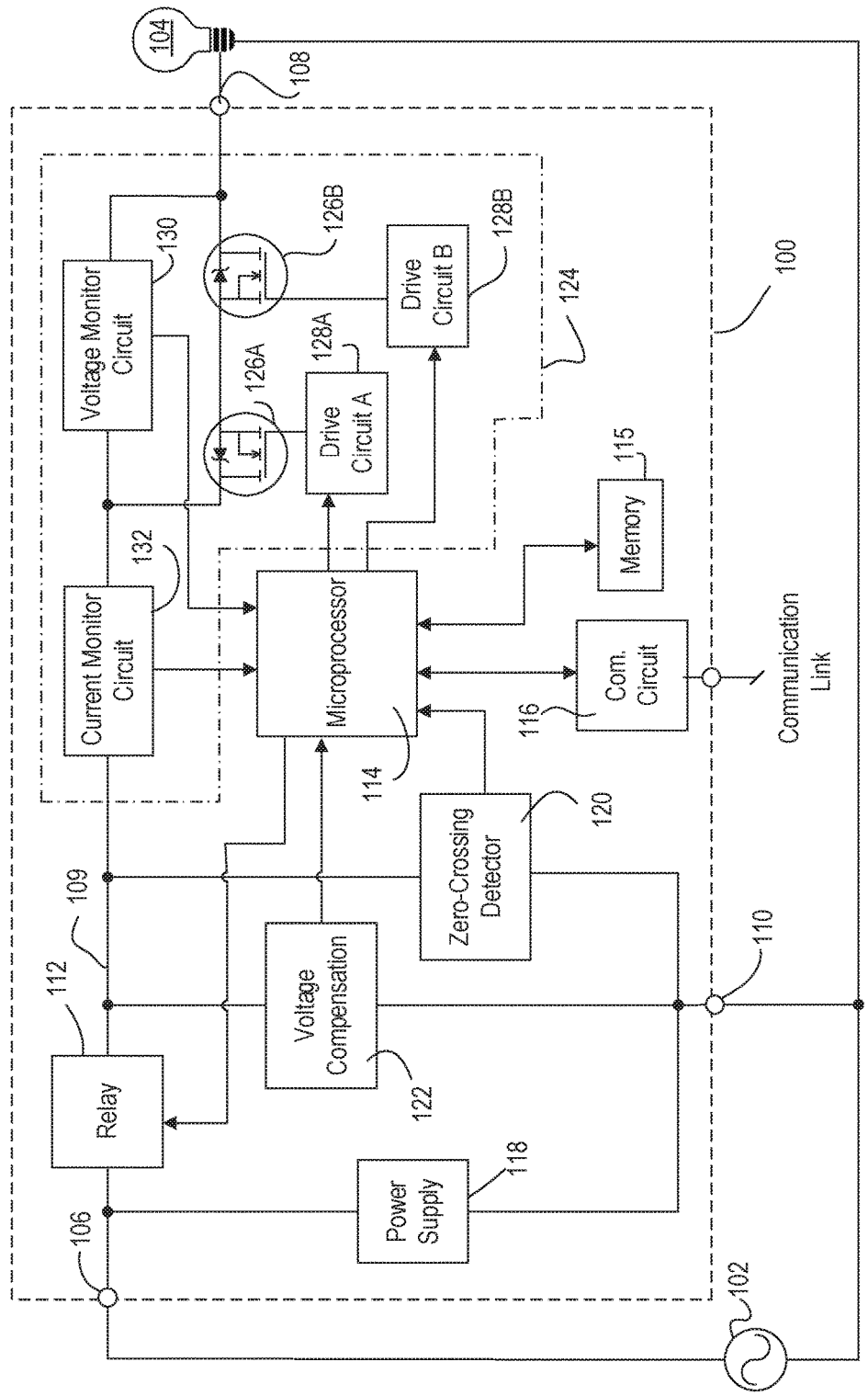
FIG. 1 is a simplified block diagram of an example load control device.

FIG. 1 is a simplified block diagram of an example load control device (e.g., load control device 100). The load control device 100 may be coupled between a hot reference of an alternating current (AC) power source 102 (e.g., 120 V, 60 Hz) and a load 104 via a hot terminal 106 and a dimmed hot terminal 108, respectively. The load 104 may be coupled between the 108 terminal and a neutral reference of the AC power source 102. The load 104 may be a lighting load, for example, an incandescent lighting load, a low voltage lighting load including a magnetic low voltage transformer, an electronic low voltage transformer, a fluorescent light source, an LED light source, or any other suitable type of lighting load. The load 104 may comprise a motor load, such as a fan or a motorized window treatment. The load control device 100 may comprise a neutral terminal 110, which may be coupled to the neutral reference of the AC power source 102.

The load control device 100 may comprise an airgap switch (e.g., a relay 112), which may be coupled to the hot terminal 106 and may provide a switched hot voltage 109 to a load control circuit 124. The load control circuit 124 may be coupled to the dimmed hot terminal and may be operable to control the amount of power provided to and the intensity of the lighting load 104. The relay 112 and/or the load control circuit 124 may be controlled by a microprocessor 114. The microprocessor 114 may be any suitable controller, for example, such as but not limited to a programmable logic device (PLD), a microcontroller, or an application specific integrated circuit (ASIC). The microprocessor 114 may be coupled to a memory 115 for storage of data regarding the operation of the load control device 100. The memory 115 may be integral to the microprocessor 114.

The load control circuit 124 may comprise a bidirectional semiconductor switch, for example, two field effect-transistors (FETs) 126A, 126B coupled in anti-series electrical connection. The bidirectional semiconductor switch may control the amount of power delivered to the load 104. Each FET 126A, 126B may be coupled to a respective drive circuit 128A, 128B, which may provide a gate voltage to each FET in order to render each FET conductive. Each FET 126A, 126B may be controlled individually during each half cycle of the AC power source 102. Using a phase-control dimming technique, the microprocessor 114 may control the drive circuits 128A, 128B to render the FETs 126A, 126B conductive for a portion of each half cycle to provide power to the load 104 and non-conductive for the other portion of the half cycle.

For example, during the positive half cycle, the drive circuit 128A may provide an active (e.g., high) gate voltage to FET 126A in order to render the FET conductive during a portion of the positive half cycle, and may remove the active gate voltage to FET 126A in order to render the FET non-conductive during the remaining portion of the positive half cycle. During the negative half cycle, the drive circuit 128B may provide the active (e.g., high) gate voltage to FET 126B in order to render the FET conductive during a portion of the negative half cycle, and may remove the active gate voltage to FET 126B in order to render the FET non-conductive during the remaining portion of the negative the half cycle. Each FET 126A, 126B may be conductive for the same amount of time within a full line cycle (e.g., the conduction time of FET 126A is equal to the conduction time of FET 126B for a given line cycle) in order to provide a symmetric voltage waveform to the load 104.

The load control device 100 may comprise a zero-crossing detector 120 that may determine the zero-crossings of the line voltage of the AC power source 102. A zero-crossing may include the time at which the line voltage transitions from a positive polarity to a negative polarity, and/or from a negative polarity to a positive polarity, for example, at the beginning of each half-cycle. The zero-crossing information may be provided as an input to the microprocessor 114. The microprocessor 114 may control the FETs 126A, 126B to be conductive and non-conductive at predetermined times relative to the zero-crossing points of the AC waveform using a phase-control dimming technique.

The zero-crossing detector 120 may comprise an active filter for receiving the line voltage from the AC power source 102, for example, to filter any noise produced by other electrical devices and for recovering the AC fundamental waveform. The recovered AC fundamental may be substantially free of noise or distortion, and of frequency components greater than at least second order harmonics that may be present on the line voltage of the AC power source 102, which might otherwise result in faulty or incorrect zero crossing detection. The filter may take an analog or digital (e.g., software) form and may be described in greater detail in commonly-assigned U.S. Pat. No. 6,091,205, issued Jul. 18, 2000, and commonly-assigned U.S. Pat. No. 6,380,692, issued Apr. 30, 2002, both entitled PHASE CONTROLLED DIMMING SYSTEM WITH ACTIVE FILTER FOR PREVENTING FLICKERING AND UNDESIRED INTENSITY CHANGES. The entire disclosures of both patents are hereby incorporated by reference.

The load control device 100 may comprise a voltage compensation circuit 122. The voltage compensation circuit 122 may integrate a signal representative of a square of an amplitude of the electrical AC waveform to produce a signal representative of the energy delivered to the load 104 in a given half-cycle. The voltage compensation circuit 122 may provide that signal to the microprocessor 114. For example, if a reverse-phase control dimming technique is being used, the microprocessor 114 may use the signal generated by the voltage compensation circuit 122 to control the load control circuit 124 in response to the energy delivered to the load 104. The voltage compensation circuit 122 may be described in greater detail in commonly-assigned U.S. Pat. No. 7,259,524, issued Aug. 21, 2007, entitled APPARATUS AND METHODS FOR REGULATING DELIVERY OF ELECTRICAL ENERGY, the entire disclosure of which is hereby incorporated by reference.

The load control device 100 may include a communication circuit 116 that may be coupled to the microprocessor 114. The microprocessor 114 may be operable to send and/or receive digital control signals via the communication circuit 116, which may be coupled to a communication link. The communication link may comprise a low-voltage wired link, or a wireless link, for example, such as but not limited to a radio frequency (RF) or an infrared (IR) communication link. For example, a plurality of remote control devices (not shown) may be coupled to the communication link. A remote control device (e.g., each remote control device) may be operable to send a digital control signal to the load control device 100 to provide for control of the load 104. A power supply 118 may be coupled between the hot terminal 106 and the neutral terminal 110. The power supply 118 may generate a direct-current (DC) voltage VCC (not shown) for powering the microprocessor 114, the communication circuit 116, and/or other low voltage circuitry of the load control device 100. For example, the load control device 100 may not require a connection to the neutral side of the AC power source 102 and may not include a neutral terminal N. The power supply 118, the voltage compensation circuit 122, and the zero-crossing detector 120 may be referenced to the dimmed hot terminal 108 instead of the neutral terminal. For example, the load control device 100 may include a user interface (not shown) coupled to the microprocessor 114, for example, such that the load control device may be readily controlled and monitored by a user.

The load control device 100 may comprise a voltage monitor circuit 130 and/or a current monitor circuit 132 which may form part of the load control circuit 124. The voltage monitor circuit 130 may be coupled across the FETs 126A, 126B, and may comprise a full-wave op-amp rectifying circuit (not shown). The voltage monitor circuit 130 may detect the voltage across the FETs 126A, 126B and provide an output signal representative of this detected voltage to the microprocessor 114. The microprocessor 114 may be operable to use this output signal from the voltage monitor circuit 130 to determine whether the load 104 is inductive, for example, as described herein. The microprocessor 114 may use the output signal from the voltage monitor circuit 130 to verify that the FETs 126A, 126B are operating properly (e.g., not shorted).

The current monitor circuit 132 may be coupled in series electrical connection with the FETs 126A, 126B. The current monitor circuit 132 may determine the magnitude of the current flowing through the FETs and provide an output signal representative of this current to the microprocessor 114. The microprocessor 114 may be operable to use this output signal from the current monitor circuit 132 to detect an over-current condition. For example, such an over-current condition may be caused by improper wiring of the load control device 100 (e.g., a mis-wiring of the 108 terminal to the neutral reference of the AC power source 102) or by the load 104 failing in a shorted state. The microprocessor 114 may be operable to turn off the FETs in response to detecting an over-current condition, for example, to protect the FETs 126A, 126B from potential damage that may result from such over-current conditions (e.g., so the FETs are not exposed to excess current).

Figure 2A:
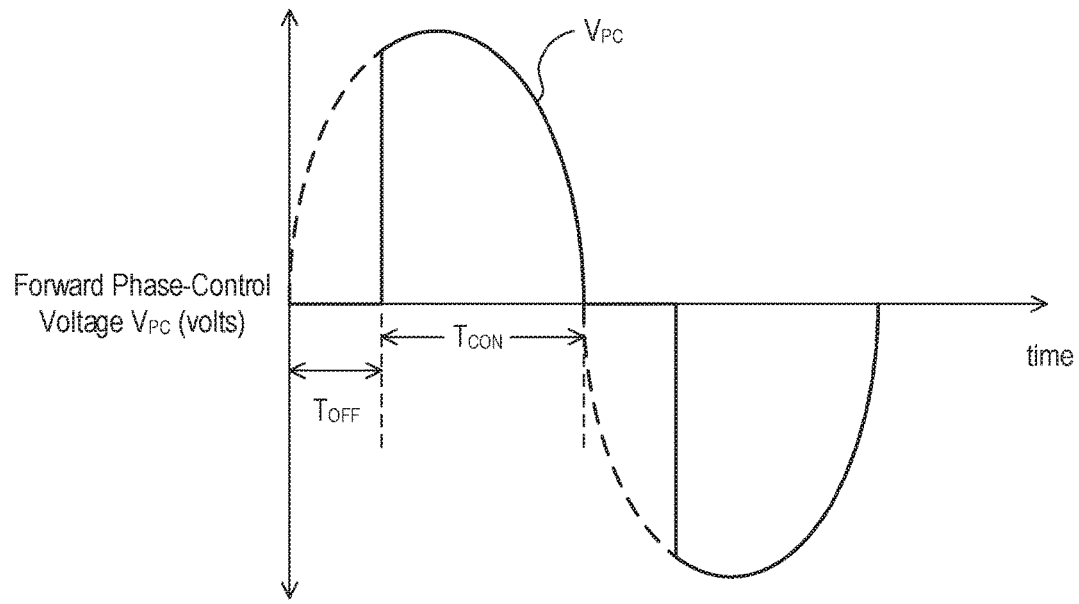
FIG. 2A is a diagram illustrating an example voltage waveform of a forward phase-control dimming signal.
Figure 2B:
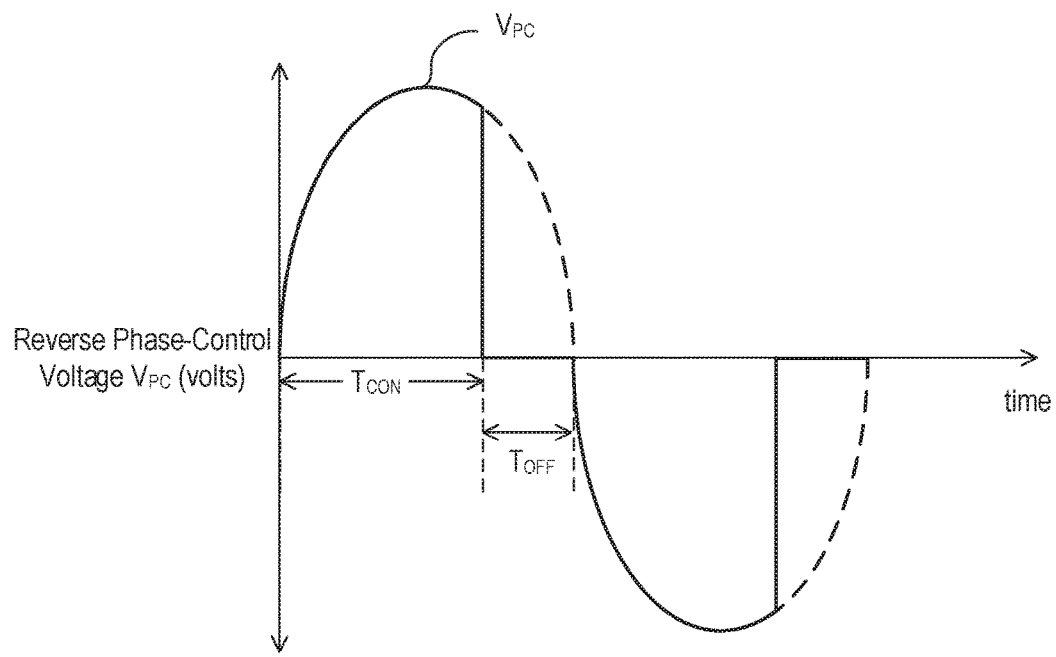
FIG. 2B is a diagram illustrating an example voltage waveform of a reverse phase-control dimming signal.

FIG. 2A is a diagram illustrating an example voltage waveform of a forward phase-control dimming signal. FIG. 2B is a diagram illustrating an example voltage waveform of a reverse phase-control dimming signal. A load control device (e.g., load control device 100) may generate a phase-control voltage $V_{PC}$ (e.g., a dimmed-hot voltage) at the dimmed hot terminal, for example, to control the intensity of a load (e.g., load 104). The phase-control voltage $V_{PC}$ may comprise a forward phase-control waveform, for example, a leading edge phase control voltage (e.g., as shown in FIG. 2A) when the load control device is using the forward phase-control dimming technique. The phase-control voltage $V_{PC}$ may comprise a reverse phase-control waveform, for example, a trailing edge phase-control voltage (e.g., as shown in FIG. 2B) when the load control is using the reverse phase-control voltage.

For example, if the load control device is using the forward phase-control dimming technique, a microprocessor of the load control device (e.g., microprocessor 114) may be operable to control a bidirectional semiconductor switch of the load control device (e.g., FETs 126A, 126B) to be non-conductive at the beginning of each half cycle for an off period $T_{OFF}$ and to control the bidirectional semiconductor switch to be conductive for a conduction period $T_{CON}$, which, for example, may last the remainder of each half cycle. If the load control device is using the reverse phase-control dimming technique, the microprocessor may be operable to control the bidirectional semiconductor switch to be conductive at the beginning of each half cycle for the conduction period $T_{CON}$ and to control the FETs to be non-conductive for the off period $T_{OFF}$. The load control device may adjust the conduction period $T_{CON}$, for example, when using a phase-control dimming technique. For example, if the load control device increases the conduction period $T_{CON}$, then the amount of power provided from an AC power source (e.g., AC power source 102) to the load may increase, which may increase the lighting intensity of the load. Similarly, if the load control device decreases the conduction period $T_{CON}$, then the amount of power provided from an AC power source (e.g., AC power source 102) to the load may decrease, which may decrease the lighting intensity of the load.

Figure 2C:
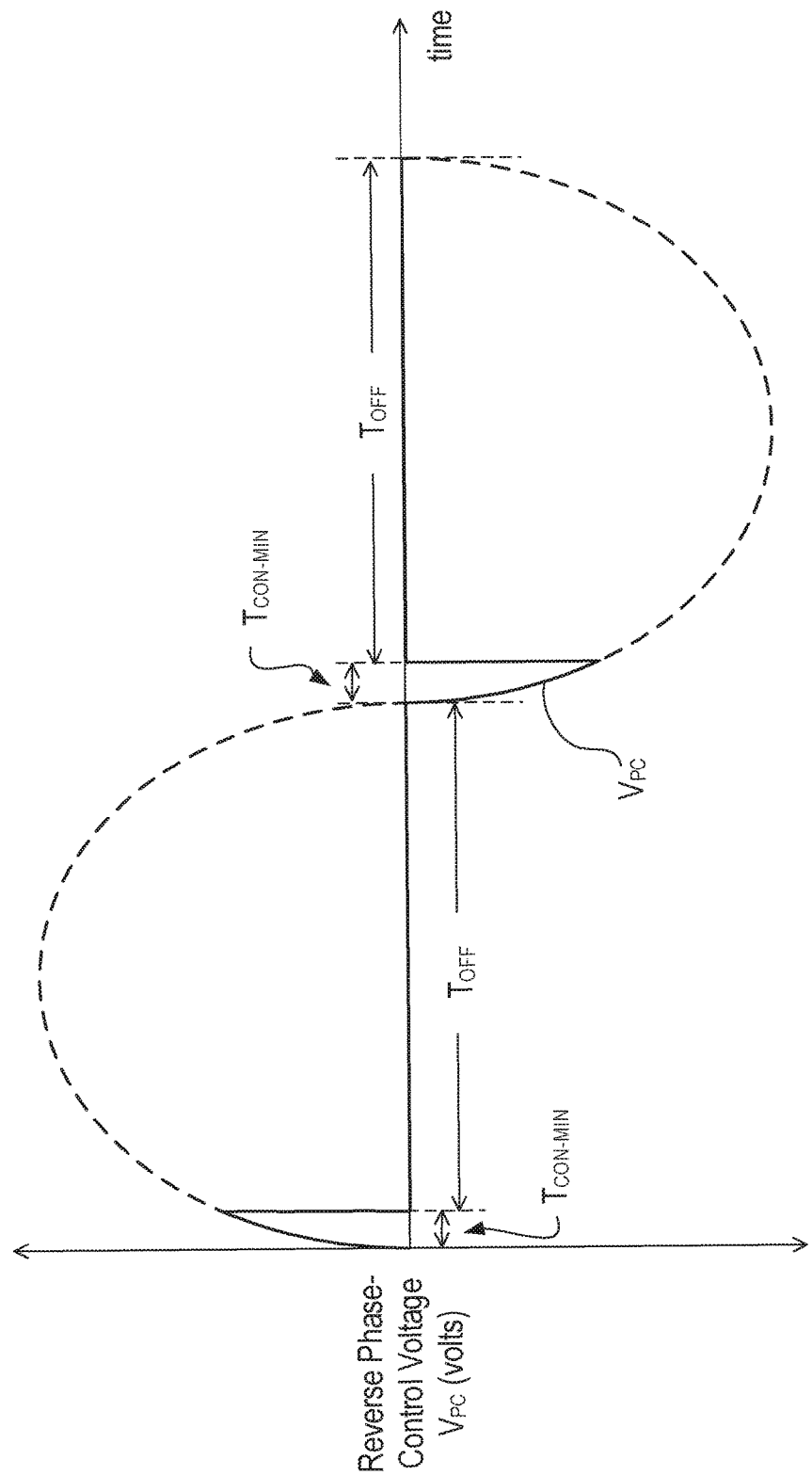
FIG. 2C is a diagram illustrating an example voltage waveform of a reverse phase-control dimming signal with a minimum conduction time.

FIG. 2C is a diagram illustrating an example voltage waveform of a reverse phase-control dimming signal with a minimum conduction time. A microprocessor (e.g., microprocessor 114) of a load control device (e.g., load control device 100) may be operable to monitor the current through a bidirectional semiconductor switch (e.g., FETs 126A, 126B), for example, via a current monitor circuit (e.g., current monitor circuit 132), and detect an over-current condition. Although the microprocessor may be operable to detect such an over-current condition, the current monitor circuit may require that the bidirectional semiconductor switch be conductive in order to monitor the current flowing through it. If there is an over-current condition, any exposure to excessive currents may damage the bidirectional semiconductor switch, and thus, such exposure should be limited. The bidirectional semiconductor switch may be initially rendered conductive for a minimum conduction period $T_{CON-MIN}$ (e.g., approximately 1 ms) when first turning the load (e.g., load 104) on.

By using the minimum conduction period $T_{CON-MIN}$, the magnitude of any possible excess current may be limited along with the duration of any possible over-current exposure. Using the minimum conduction period $T_{CON-MIN}$ in conjunction with a forward phase-control dimming technique may be insufficient to fully protect the bidirectional semiconductor switch from permanent damage in the event of an over-current condition. For example, the microprocessor and the current monitor circuit may not be able to respond quickly enough to the detected over-current condition to sufficiently protect the bidirectional semiconductor switch (e.g., by turning off the bidirectional semiconductor switch).

The minimum conduction period $T_{CON-MIN}$ may be used in conjunction with the reverse phase-control dimming technique, for example, as shown in FIG. 2C, such that the bidirectional semiconductor switch may be rendered conductive at the very beginning of each half cycle, for example, when the magnitude of voltage of an AC power source (e.g., AC power source 102) is zero volts or nearly zero volts. Thus, the magnitude of any excess current may be at its lowest possible magnitude, and the current monitor circuit may detect the indication of an over-current condition to limit the overall exposure of the bidirectional semiconductor switch to such excessive currents.

The inrush current of a load (e.g., an incandescent load having a cold tungsten filament) may be detected by the current monitor circuit as an over-current condition. An over-current condition caused by an inrush current may not be considered to be a fault condition. In the event of normal inrush current, the bidirectional semiconductor switch of the load control device may not need the protection that is required in the event of excessive current caused from a fault condition. Providing such protection of the bidirectional semiconductor switch in response to an inrush current may be undesirable, for example, as it may impede the operation of the load control device. The load control device may distinguish between an over-current condition caused by a fault condition and an over-current condition caused by inrush current. For example, the microprocessor of the load control device may detect this distinction, for example, by monitoring the rate of change as well as the total magnitude of the current flowing through the bidirectional semiconductor switch. When using the forward phase-control dimming technique, the inductance of the power wiring (e.g., line inductance) may act to limit the rate of change of current flowing through the bidirectional semiconductor switch, which, for example, may make it difficult to distinguish between an over-current condition caused by the fault condition and an over-current condition caused by an inrush current. When using the reverse phase-control dimming technique, the effect of the line inductance may be minimized. The microprocessor may make this distinction more reliably when the bidirectional semiconductor switch is initially rendered conductive for a minimum conduction period $T_{CON-MIN}$ using the reverse phase-control dimming technique instead of the forward phase-control technique.

Figure 3:
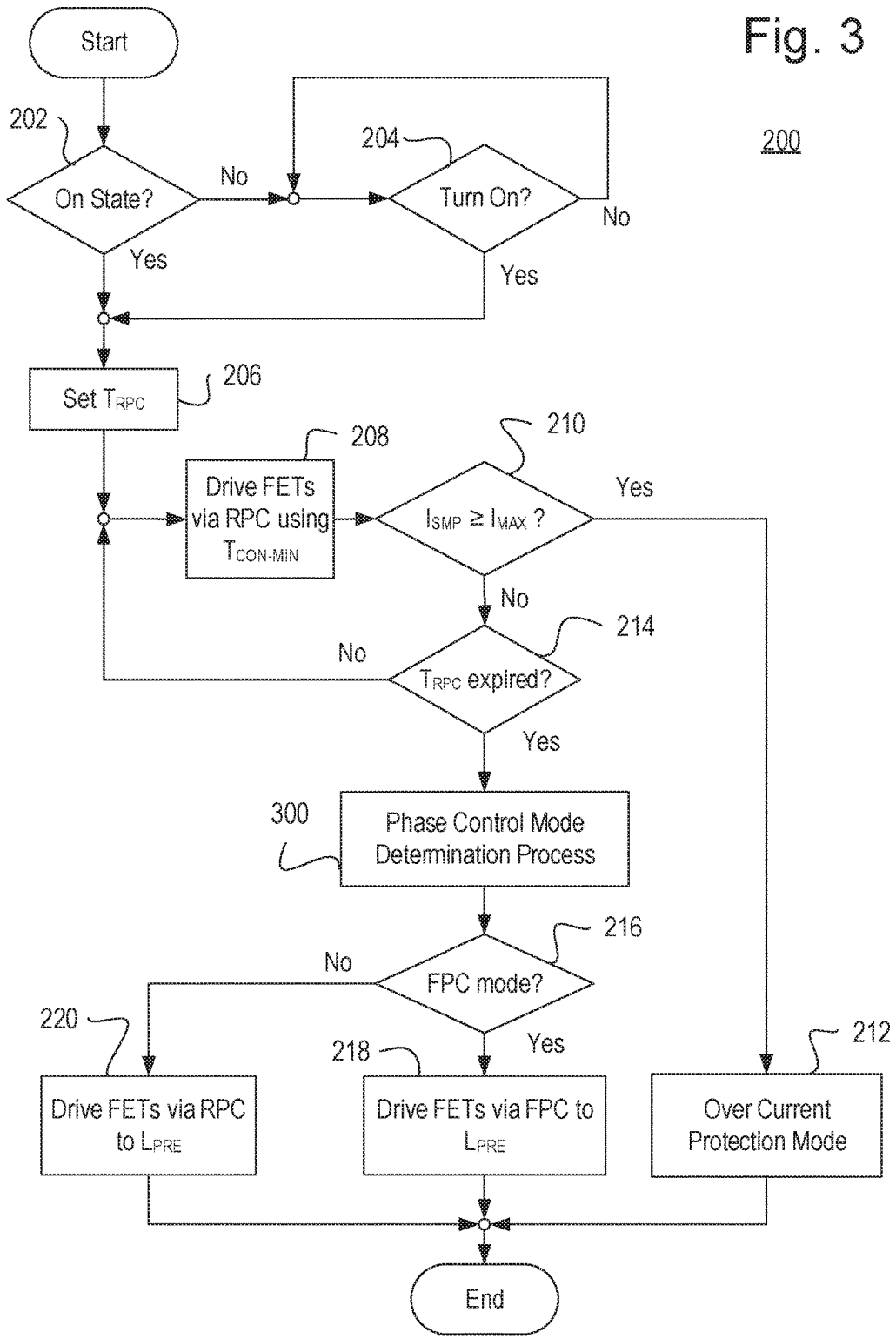
FIG. 3 is a simplified flowchart of an example start-up procedure.

FIG. 3 is a simplified flowchart of an example procedure (e.g., start-up procedure) executed by a microprocessor. The start-up procedure 200 may be executed by a microprocessor (e.g., microprocessor 114) when power is first applied to a load control device (e.g., load control device 100). For example, the start-up procedure 200 may be executed by the microprocessor following a reset event. The start-up procedure 200 may provide for the load control device to use a reverse phase-control (RPC) dimming technique (e.g., to operate in a reverse phase-control mode) for a predetermined period of time $T_{RPC}$. For example, the predetermined period of time may be two lines cycle periods of an AC power source (e.g., AC power source 102). After using a reverse phase-control dimming technique for the predetermined period of time $T_{RPC}$, the start-up procedure 200 may provide for the load control device to use a forward phase-control (FPC) dimming technique (e.g., operating in a forward phase-control mode).

Referring to FIG. 3, at 202 the microprocessor may determine whether the load control device should stay in the on state, for example, by checking the contents of a memory (e.g., the memory 115). If it is determined that the load control device should be on, then the microprocessor may initialize a timer to the predetermined period of time $T_{RPC}$ at 206. If it is determined that the load control device should not be in the on state, then the microprocessor may wait for a command to turn on at 204 until proceeding to 206.

The microprocessor may render a bidirectional semiconductor switch (e.g., the FETs 126A, 126B) conductive, for example, using the minimum conduction period $T_{CON-MIN}$ and the reverse phase-control dimming technique at 208. The microprocessor may sample the output signal $I_{SMP}$ from a current monitor circuit (e.g., current monitor circuit 132), for example, which may be representative of the magnitude of the current flowing through the bidirectional semiconductor switch. For example, the microprocessor may look for evidence of an over-current condition. The microprocessor may continue to sample the output signal $I_{SMP}$ while driving the bidirectional semiconductor switch conductive for the minimum conduction period $T_{CON-MIN}$, for example, until the predetermined period of time $T_{RPC}$ expires at 214 or the sampled output signal $I_{SMP}$ reaches or exceeds a maximum current threshold $I_{MAX}$ at 210. If the microprocessor determines that the sampled output signal $I_{SMP}$ exceeds the maximum current threshold $I_{MAX}$ (e.g., 56 A), then the microprocessor may enter an over-current protection mode at 212 before the start-up procedure 200 exits.

During the over-current protection mode 212, the microprocessor may turn-off the bidirectional semiconductor switch (e.g., initially), and may analyze the rate of change of the sampled output signal $I_{SMP}$ to determine whether the over-current condition may have been caused by normal inrush current or a true fault condition. If the microprocessor determines that the rate of change of the sampled output signal $I_{SMP}$ is indicative of normal inrush current during the over-current protection mode 212, then the microprocessor may render the bidirectional semiconductor switch conductive in the following line cycle while continuing to monitor the current via the current monitoring circuit.

Figure 4:
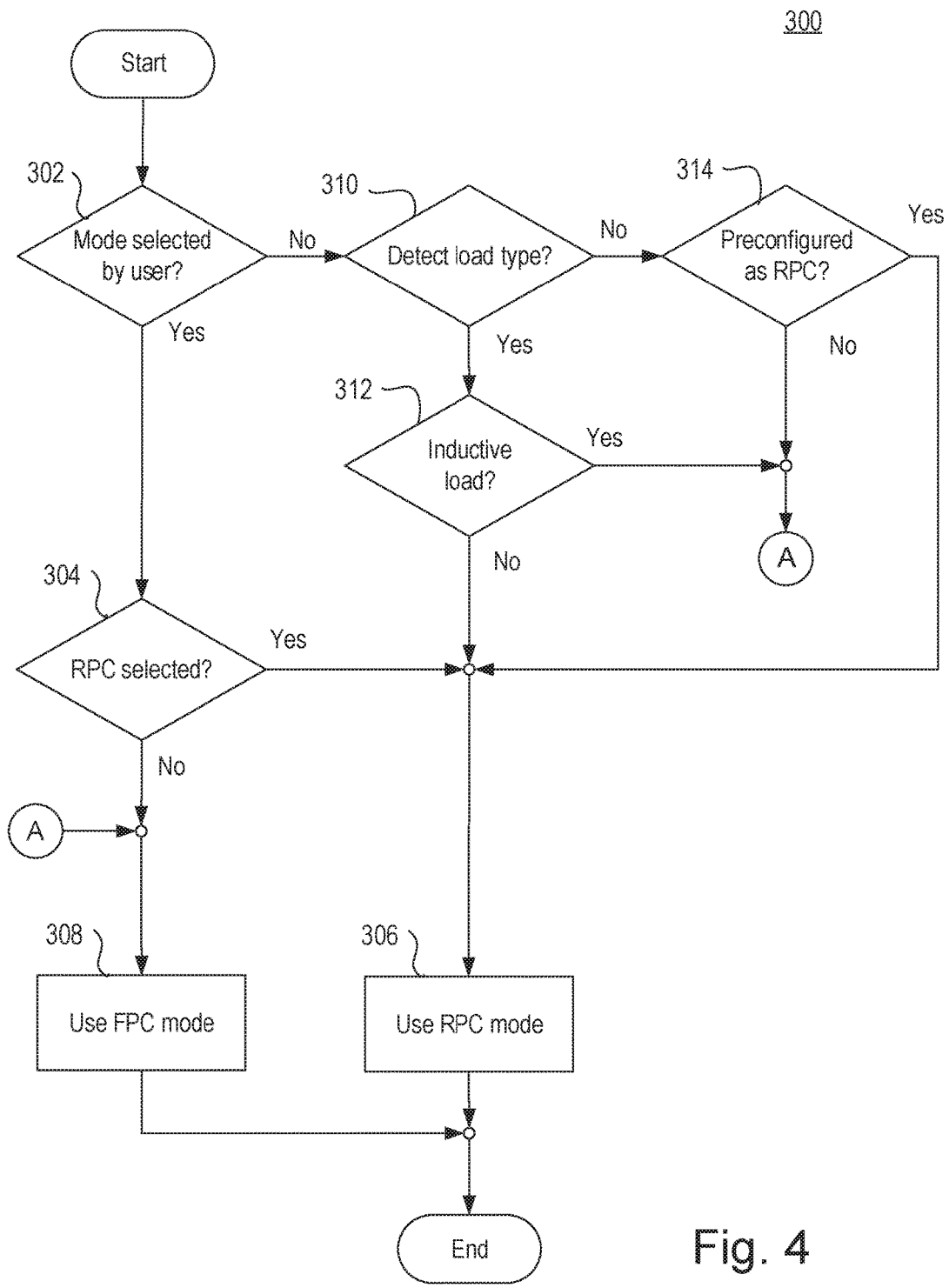
FIG. 4 is a simplified flowchart of an example phase control mode determination procedure.

If the microprocessor does not detect an over-current condition and the predetermined period of time $T_{RPC}$ expires at 214, then the microprocessor may perform a phase control mode determination process (e.g., a phase control mode determination process 300 as shown in FIG. 4), for example, to determine whether the load control device should use the reverse phase-control dimming technique or the forward phase-control dimming technique. At 216, the microprocessor may check whether the load control device should operate in the forward phase-control (FPC) mode and if so, the microprocessor may control the bidirectional semiconductor switch using the forward phase-control dimming technique at 218. For example, the microprocessor may adjust the conduction time $T_{CON}$ of the bidirectional semiconductor switch to achieve a desired preset lighting intensity $L_{PRE}$ of a lighting load (e.g., lighting load 104). The microprocessor may employ a fading technique to gradually increase the lighting intensity of the lighting load to the preset intensity $L_{PRE}$. If it is determined that the microprocessor should not operate in the forward-phase control mode at 216, then the microprocessor may continues to use the reverse phase-control (RPC) dimming technique, and may control the bidirectional semiconductor switch to achieve the preset lighting intensity $L_{PRE}$ of the lighting load at 220.

FIG. 4 is a simplified flowchart of a phase control mode determination process executed by a microprocessor. A microprocessor (e.g., microprocessor 114) may determine whether the operating mode (e.g., reverse phase-control mode or forward phase-control mode) has been programmed or selected by a user, for example, after installation of a load control device (e.g., load control device 100) at 302. If the microprocessor determines that the operating mode has been selected by the user, then the microprocessor may check whether the reverse phase-control mode has been selected at 304. If the reverse phase-control mode has been selected at 304, then the microprocessor may determine at 306 that the load control device should use the reverse phase-control mode for its subsequent operation. The microprocessor may save this mode information in memory, for example, in local memory internal to the microprocessor or in a memory (e.g., memory 115). If at 304, the reverse phase-control mode has not been selected, then the microprocessor may determine that the load control device should use forward phase-control mode at 308 for its subsequent operation.

If the microprocessor determines that the operating mode has not been selected by the user at 302, then at 310 the microprocessor may determine whether it is capable of automatically detecting the type of load (e.g., load 104) to which the load control device is coupled. If the microprocessor is capable of detecting the load type, then the microprocessor may determine whether the load has inductive characteristics at 312. If the microprocessor determines that the load has inductive characteristics, then the microprocessor may determine that the load control device should use forward phase-control mode at 308 for its subsequent operation. If the microprocessor determines that the load does not have inductive characteristics, then the microprocessor may proceed to step 306 to determine that the load control device should use reverse phase-control mode for its subsequent operation.

If the microprocessor is not capable of detecting the load type, then the microprocessor may determine whether the load control device has been preconfigured (e.g., factory programmed) to operate in the reverse phase-control mode at 314. If so, then the microprocessor may determine that the load control device should use the reverse phase-control mode for its subsequent operation at 306. Otherwise, the microprocessor may determine at 308 that the load control device should use forward phase-control mode for its subsequent operation.

Figure 5:
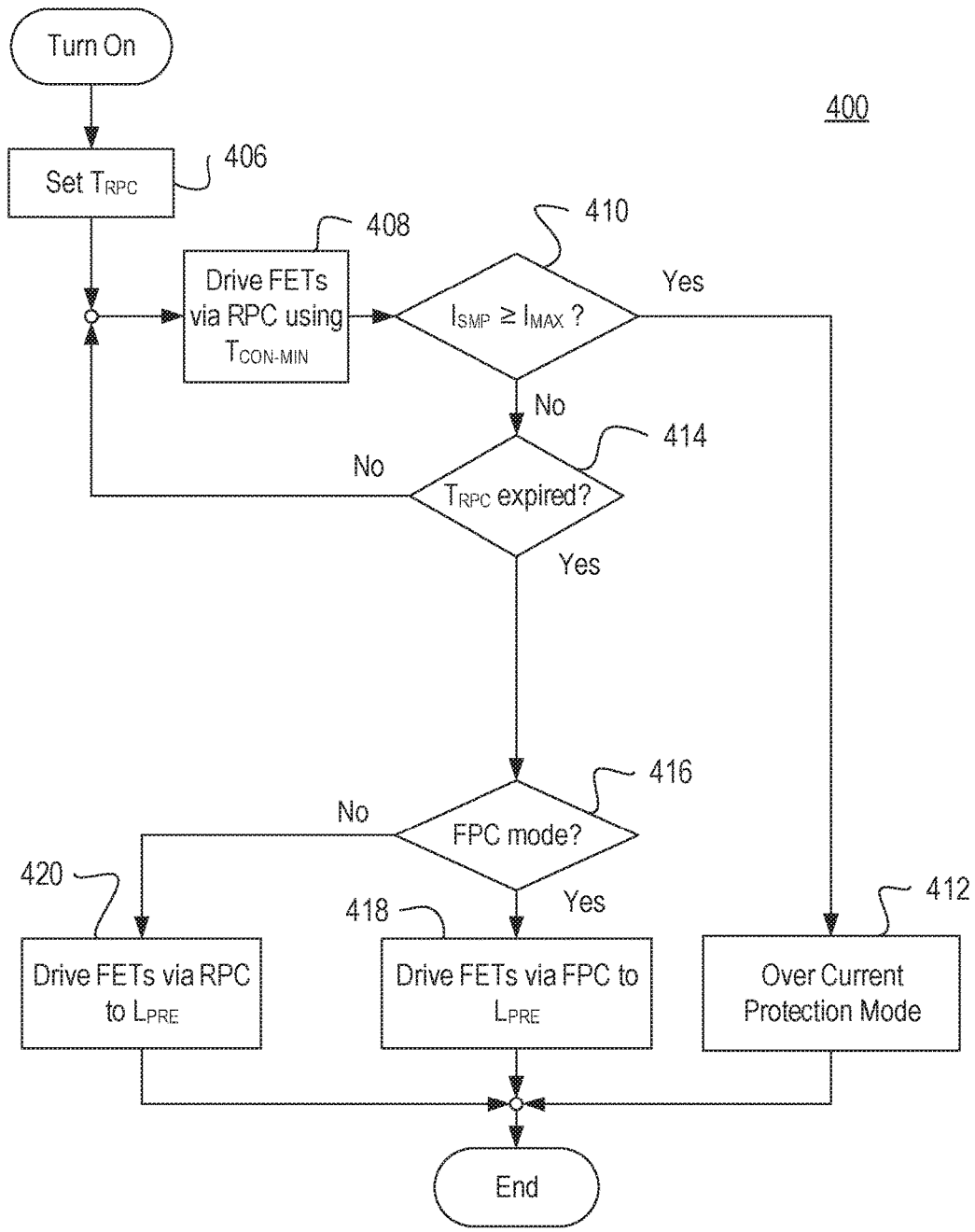
FIG. 5 is a simplified flowchart of an example turn-on procedure.

FIG. 5 is a simplified flowchart of a turn-on procedure executed by a microprocessor during normal operation. For example, the turn-on procedure 400 may be executed by a microprocessor (e.g., microprocessor 114) of a load control device (e.g., load control device 100) in response to receiving a command to transition from an electronic off state (e.g., when the microprocessor is powered, but a load is off) to an electronic on state. The turn-on procedure 400 may comprise one or more of decisions utilized by the start-up procedure 200 (e.g., as shown in FIG. 3). For example, the turn-on procedure 400 may not comprise 202 (e.g., checking the on state) and 204 (e.g., waiting for an on command) of the start-up procedure 200, for example, because the turn-on procedure 400 may be initiated in response to having received a command to turn on the load (e.g., load 104). The turn-on procedure 400 may not comprise the phase control mode determination procedure 300 that may be used during the start-up procedure 200. The microprocessor may not re-determine the phase control mode with every transition from electronic off to on. The microprocessor may rely upon the mode that was previously determined during the start-up procedure 200 at initial power-up. The turn-on procedure 400 may comprise the phase control mode determination procedure 300. 406-420 of the turn-on procedure 400 may provide for the load control device 100 to use a reverse phase-control dimming technique (e.g., to operate in a reverse phase-control mode) for a predetermined period of time $T_{RPC}$ before using a forward phase-control dimming technique (e.g., operating in a forward phase-control mode) during every transition from the electronic off state to the on state during operation. For example, the predetermined period of time $T_{RPC}$ may be two lines cycle periods of an AC power source (e.g., AC power source 102).

Figure 6:
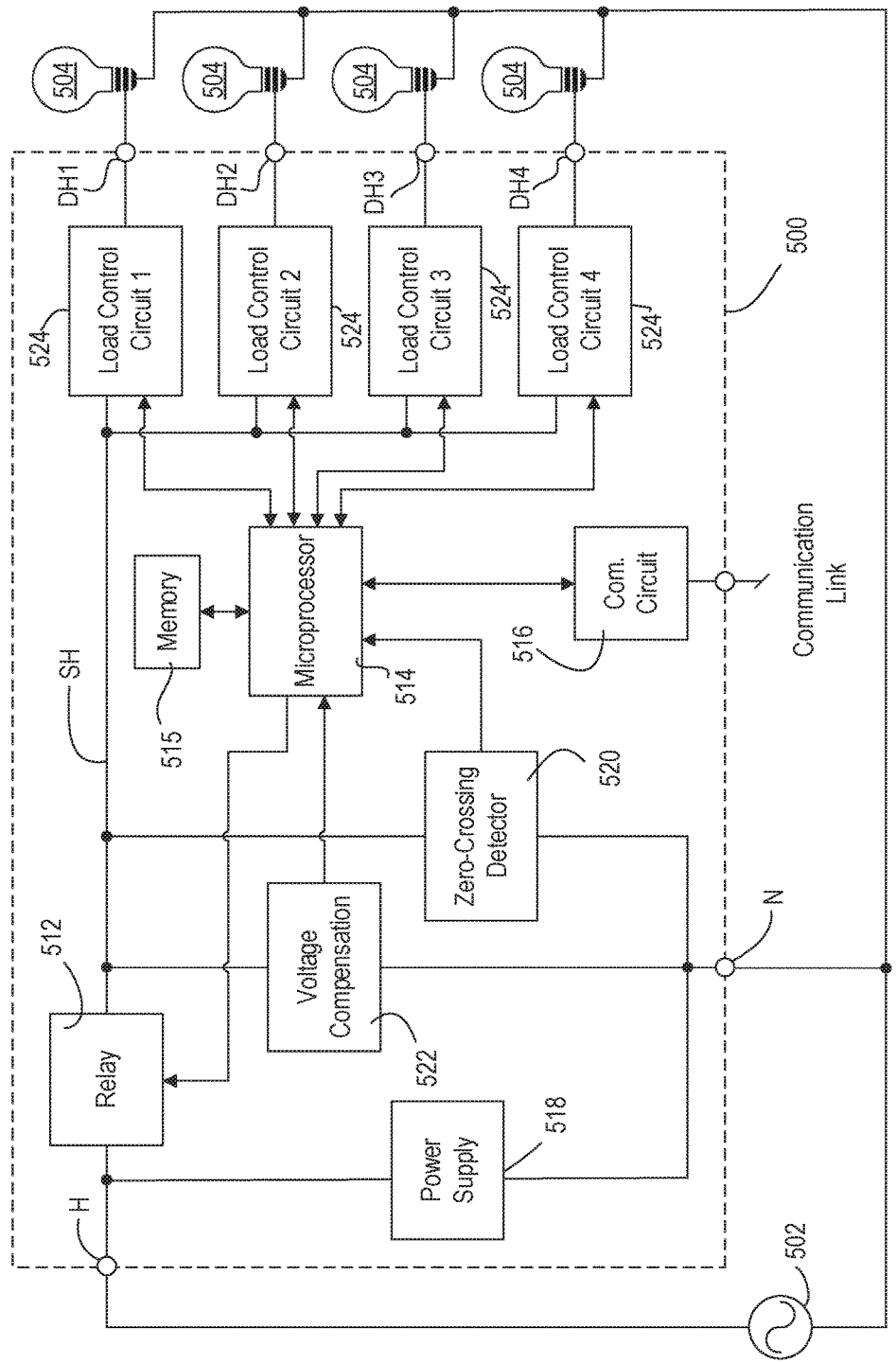
FIG. 6 is a simplified block diagram of an example load control device.

FIG. 6 is a simplified block diagram of a load control device. Load control device 500 may comprise one or more (e.g., four) load control circuits 524 to control (e.g., individually control) the one or more (e.g., four) loads 504, for example, via one or more (e.g., four) dimmed hot terminals DH1, DH2, DH3, DH4. The loads 504 may be lighting loads. A microprocessor 514 may be operable to control each load control circuit 524 in the same manner as microprocessor 114 of load control device 100. One or more of the functional blocks of load control device 500 may be substantially the same as the functional blocks of the load control device 100.

The dimming techniques described herein may be beneficial when performing an over-current detection (e.g., as described herein), but such a dimming technique may have additional applications. For example, a load control device (e.g., load control device 100 or load control device 500) may use the reverse phase-control dimming technique for a predetermined period of time before using the forward phase-control dimming technique during every transition from the electronic off state to the on state to improve the dimming performance of certain lighting load types. For example, some lighting loads, such as but not limited to compact fluorescent lamps and lighting emitting diodes (LEDs), may be designed by a lighting manufacturer to be dimmed with a forward phase-control dimming technique. Accordingly, a load control device may use the forward phase-control dimming technique during operation when dimming such loads. However, such lighting loads may also have a capacitive front end, and thus, it may be advantageous to use the reverse phase-control dimming technique for a predetermined period of time when the load is transitioning from off to on. Further, when using the reverse phase-control dimming on such loads, it may be advantageous to use a conduction time $T_{CON}$ that is greater than the minimum conduction period $T_{CON-MIN}$. For example, when the load is transitioning from off to on, it may be advantageous to use a peak of line conduction time $T_{CON-PK}$ (e.g., having approximately a 90 degree phase angle) such that the FETs are rendered non-conductive near the peak of the AC line voltage when using the reverse phase-control dimming technique for the predetermined period of time $T_{RPC}$. Thereafter, the load control device may use the forward phase-control dimming technique, and may subsequently use the minimum conduction period $T_{CON-MIN}$ and then gradually increase the conduction time of the FETs over multiple line cycles to smoothly adjust the intensity of the lighting load to the desired preset lighting intensity $L_{PRE}$. This may allow the capacitive front end of these certain load types to charge quickly (e.g., when using the reverse phase-control dimming technique) before the load control device begins to control the intensity of the lighting load (e.g., when using the forward phase control dimming technique).

Figure 7:
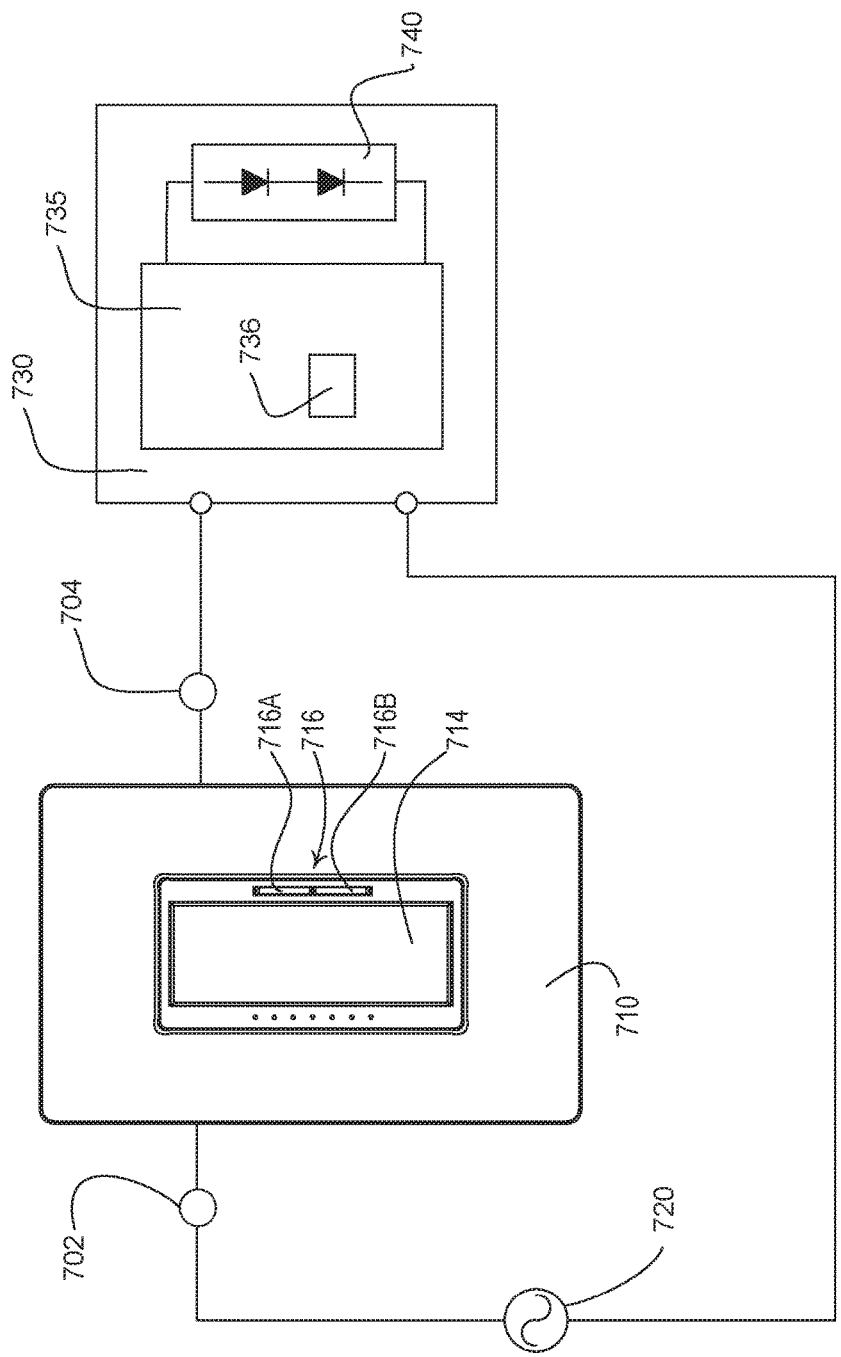
FIG. 7 is a simplified block diagram illustrating an example of a dimmer switch coupled to an LED lamp.

FIG. 7 illustrates an example of a dimmer switch coupled to an LED lamp. A dimmer switch 710 may include a hot terminal 702 that is coupled to an AC power source 720, and a dimmed hot terminal 704 that is coupled to a load (e.g., an LED lamp 730). The LED lamp 730 may comprise an LED driver 735 and an LED light source 740. The LED lamp 730 may be coupled to the dimmed hot terminal 704 and the neutral connection of the AC power source 720. The LED driver 735 of the LED lamp 730 may further comprise a bus capacitor 736 adapted to be coupled to the dimmed hot terminal 704 of the dimmer switch 710 and the neutral connection of the AC power source 720. The dimmer switch 710 may be operable to provide the dimmed hot voltage using different phase control types, for example, forward phase control and reverse phase control. In addition, the dimmer switch 710 may be operable to provide a full conduction voltage to the LED lamp 730.

The dimmer switch 710 may include a tap switch 714 for turning the LED light source 740 on and off, and a dimming rocker 716 which may be used to adjust the intensity of the LED light source 740 (e.g., increase and decrease the intensity by tapping the upper 716A and lower 716B portions of the dimming rocker 716, respectively). The dimmer switch 710 may include a controllably conductive device (e.g., one or more bidirectional semiconductor switches) that are operable to control the amount of power provided to the LED lamp 730 from the AC power source 720 via a phase control signal. For example, the bidirectional semiconductor switch of dimmer switch 710 may be implemented as two field effect transistors (FETs) in anti-series connection or a single FET inside a full-wave rectifying bridge.

Figure 8:
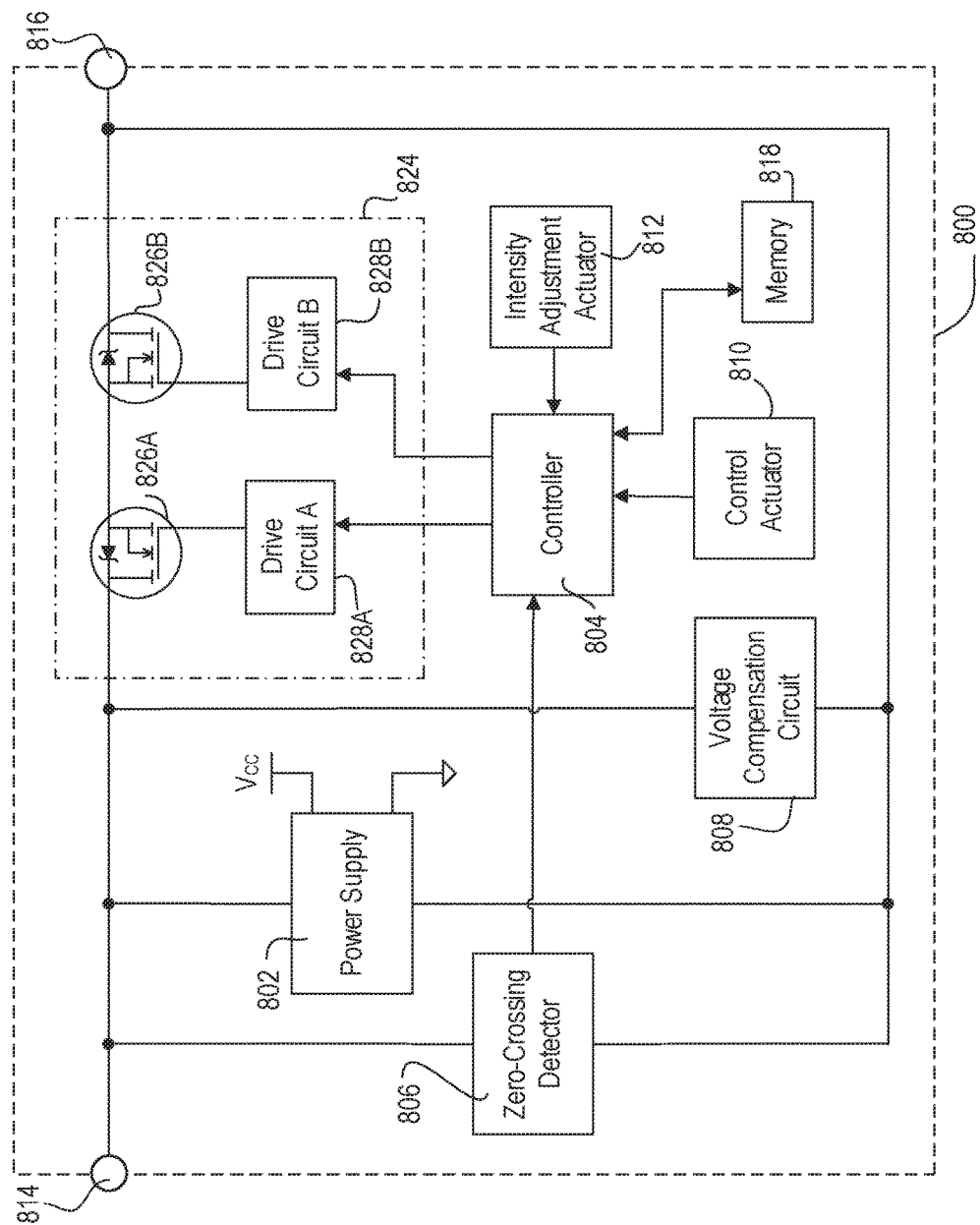
FIG. 8 is a simplified block diagram of an example load control device.

FIG. 8 is a simplified block diagram of a load control device. Load control device 800 may comprise a power supple 802, a controller 804 (e.g., a microprocessor), a zero-crossing detector 806, a voltage compensation circuit 808, a control actuator 810, an intensity adjustment actuator 812, a memory 818, a bidirectional semiconductor switch 824, a hot terminal 814, and a dimmed-hot terminal 816. The load control device 800 may be, for example, a two wire dimmer. The load control device 800 may be similar to the dimmer switch 710.

The load control device 800 may be utilized to control an amount of power delivered to a load. The load may be a lighting load, for example, an incandescent lighting load, a low voltage lighting load including a magnetic low voltage transformer, an electronic low voltage transformer, a fluorescent light source, a compact fluorescent lamp (CFL), an LED lamp, or any other suitable type of lighting load or combination thereof. The load 104 may comprise a motor load, such as a fan or a motorized window treatment.

The bidirectional semiconductor switch 824 may be operably coupled in series electrical connection between the hot terminal 814 and the dimmed hot terminal 816, for example, to control the power delivered to the load. The bidirectional semiconductor switch 824 may comprise two field effect transistors (FETs) 826A, 826B in anti-series connection and two drive circuits 828A, 828B. The bidirectional semiconductor switch 824 may be implemented as a single FET inside a rectifying bridge. The bidirectional semiconductor switch 824 may be a set of anti-series IGBTs with corresponding body diodes. The bidirectional semiconductor switch 824 may provide a reverse phase control signal, a center phase control signal, a forward phase control signal, or a full conduction signal to a load as needed.

The controller 804 may be operably coupled to the bidirectional semiconductor switch 824. The controller 804 may be coupled to the bidirectional semiconductor switch 824 for rendering the bidirectional semiconductor switch conductive and nonconductive. The controller 804 may be configured to control the bidirectional semiconductor switch 824 in response to a zero-crossing detector 806. The zero-crossing detector 806 may be configured to determine the zero-crossings of an input AC waveform from an AC power source via the hot terminal 814. The zero-crossing detector 806 may be similar to the zero-crossing detector 120 described herein. Similarly, the voltage compensation circuit 808 may be similar to the voltage compensation circuit 122 described herein.

The controller 804 may receive an input from the control actuator 810 and/or the intensity adjustment actuator 812. The control actuator 810 may be operable to allow for turning on and off the load. The control actuator 810 may be, for example, an airgap switch, a relay, etc. The intensity adjustment actuator 812 may be operable to allow a user to adjust the amount of power being delivered to the load. For example, the intensity adjustment actuator 812 may be operable to allow for the adjustment of a lighting intensity of the load, for example, from a low-end intensity setting to a high-end intensity setting. The intensity adjustment actuator 812 may be a slide actuator, a rotary knob, etc.

The controller 804 may be any suitable controller or microprocessor, for example, such as but not limited to a programmable logic device (PLD), a microcontroller, or an application specific integrated circuit (ASIC). The controller 804 may be coupled to the memory 818 for storage of data regarding the operation of the load control device 800. The memory 818 may be integral to the controller 804.

FIG. 9 is a diagram illustrating an example voltage waveform of a dimming procedure. The waveform 900 may comprise a phase control signal that operates in reverse phase control mode and forward phase control mode. The voltage waveform 900 may be a representative phase control signal utilized during the dimming procedure 200 of FIG. 3, for example, where the predetermined period of time $T_{RPC}$ of the start-up procedure 200 is defined as the first two half-line cycle periods of an AC power source (e.g., when the predetermined period of time $T_{RPC}$ is equal to approximately 0.017 sec).

A load control device (e.g., load control device 800) may determine to operate a load using a phase control signal in a forward phase control mode. After determining to operate the load using a phase control signal in a forward phase-control mode, the load control device may provide a phase control signal utilizing a reverse phase-control dimming technique to the load for a predetermined period of time, for example, in response to receiving a command to turn the load on. For example, the predetermined period of time may be the first two half-line cycles of the phase control signal (e.g., 0.017 sec). Thereafter, the load control device may provide the phase control signal utilizing a forward phase-control dimming technique for the following half-line cycles. The first two half-line cycles utilizing a reverse phase-control dimming technique may be used to charge a capacitor (e.g., a bus capacitor) of the load (e.g., the LED driver 735 of the lamp 730). Thereafter, the load control device may utilize a forward phase-control dimming technique, for example, to operate the load.

The conduction time $T_{CON-R}$ of the first half-line cycle of reverse phase-control may be equal to the conduction time $T_{CON-F1}$ of the first half-line cycle of forward phase-control. However, the conduction time $T_{CON-R}$ of the first half-line cycle of reverse phase-control may or may not be equal to the conduction time of subsequent half-line cycles of forward phase-control. For example, the conduction time $T_{CON-R}$ may be equal to the conduction time $T_{CON-F2}$ of the second half-line cycle of forward phase-control. However, the conduction time $T_{CON-R}$ may not be equal to the conduction time $T_{CON-F2}$, for example, in a ramp-up start procedure where $T_{CON-F1}$ may be less than $T_{CON-F2}$.

Similarly, the Root Mean Squared (RMS) voltage $V_{RMS-R}$ of the first half-line cycle of reverse phase-control may be equal to the RMS voltage $V_{RMS-F1}$ of the first half-line cycle of forward phase-control. However, the RMS voltage $V_{RMS-R}$ of the first half-line cycle of reverse phase-control may or may not be equal to the RMS voltage of subsequent half-line cycles of forward phase-control. For example, the RMS voltage $V_{RMS-R}$ may be equal to the RMS voltage $V_{RMS-F2}$ of the second positive half-line cycle of forward phase-control. However, the RMS voltage $V_{RMS-R}$ may not be equal to the RMS voltage $V_{RMS-F2}$, for example, in a ramp-up start procedure where the RMS voltage $V_{RMS-F1}$ of the first half-line cycle of forward phase-control may be less than the RMS voltage $V_{RMS-F2}$ of the second positive half-line cycle of forward phase-control.

Figure 10A:
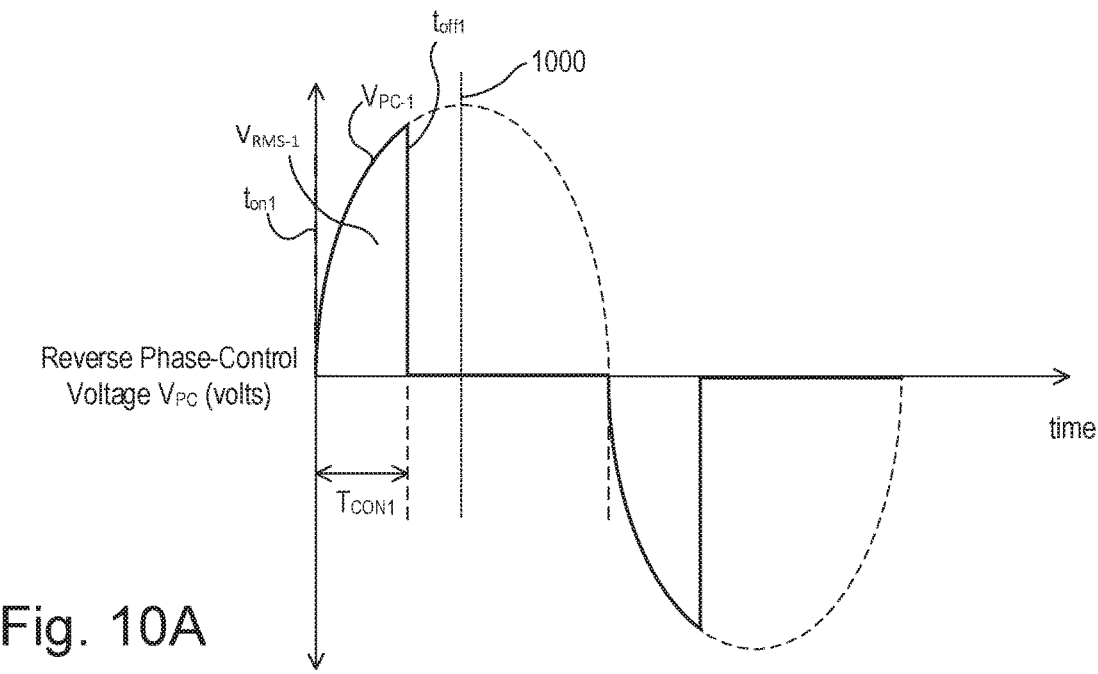
FIGS. 10A-10E are diagrams illustrating waveforms of an example dimming procedure.
Figure 10B:
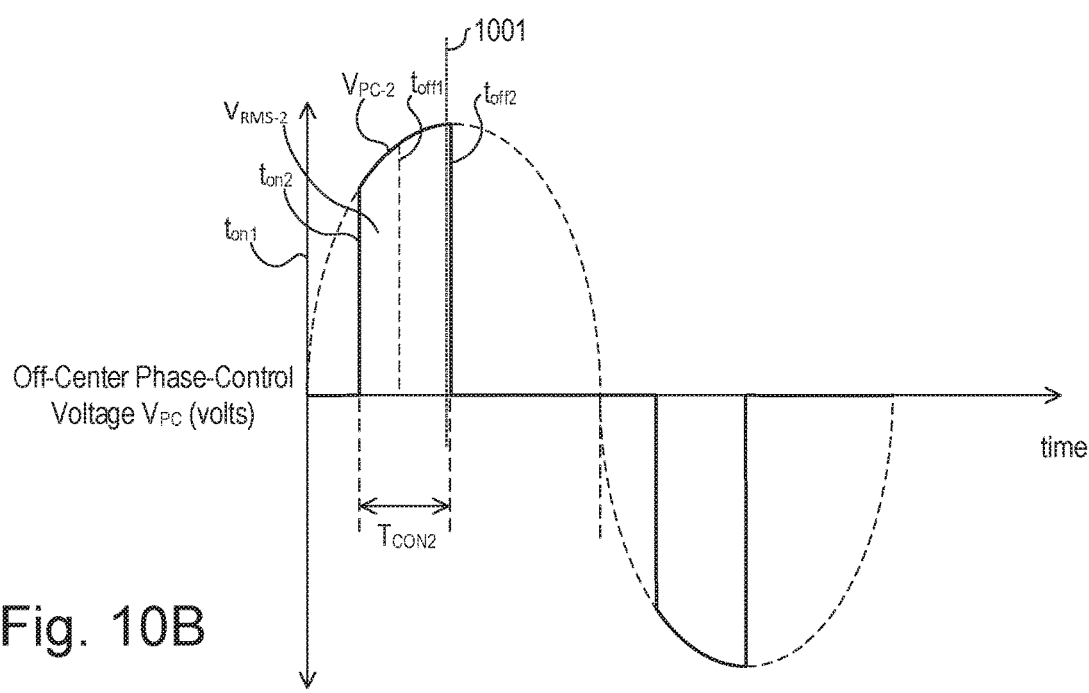
Figure 10C:
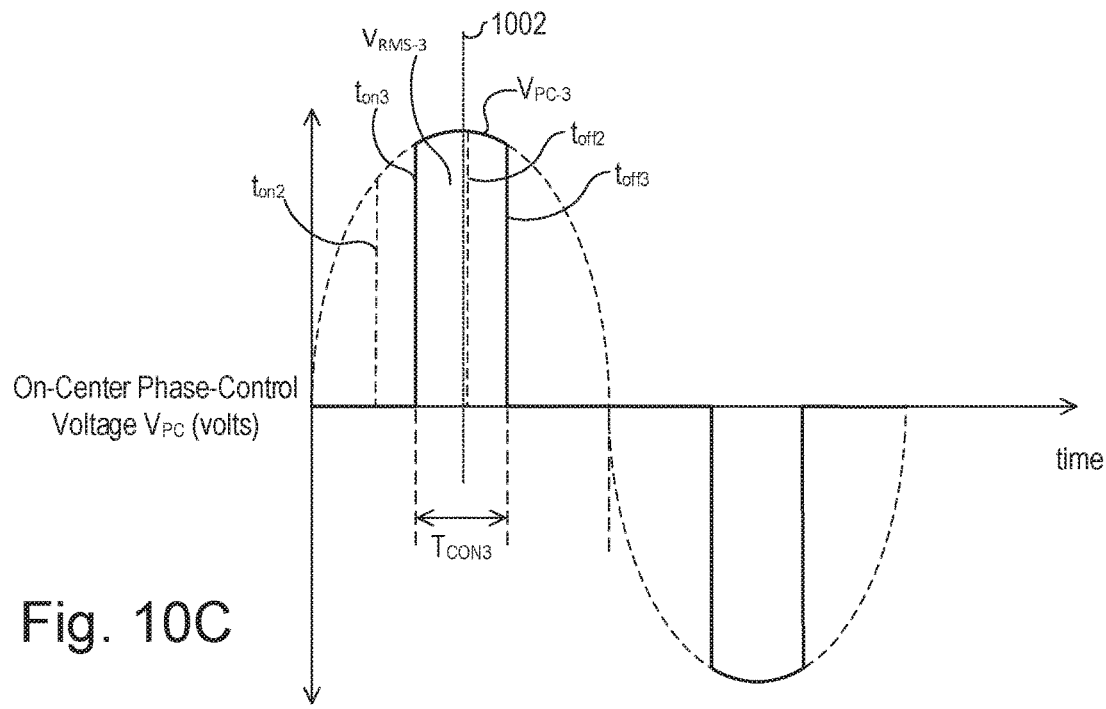
Figure 10D:
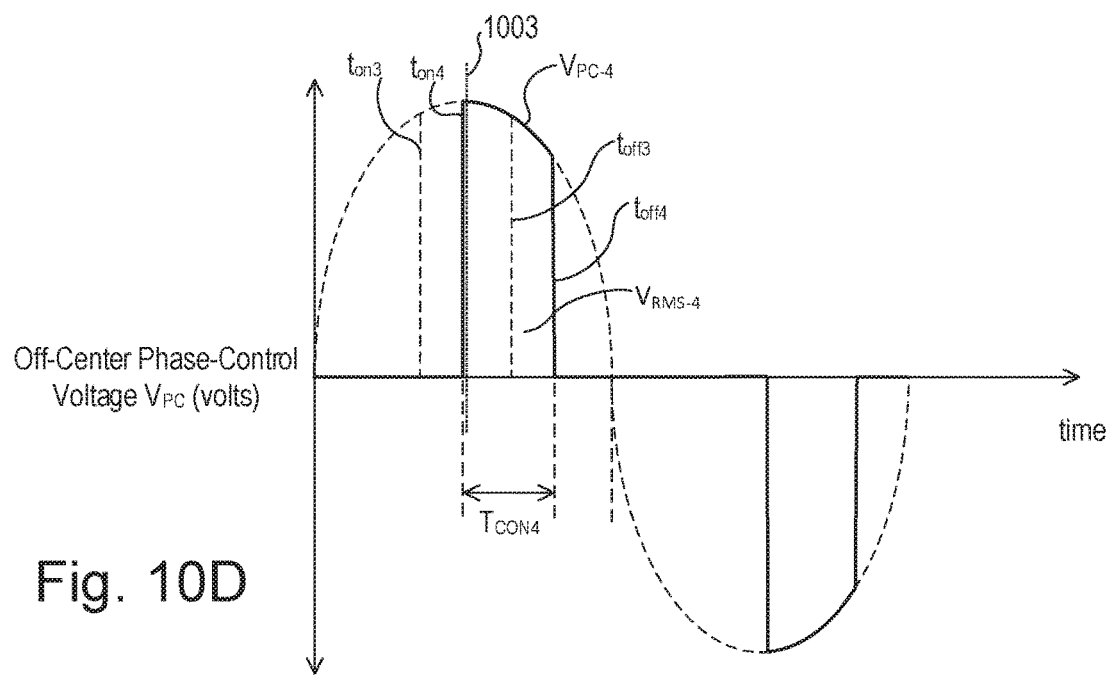
Figure 10E:
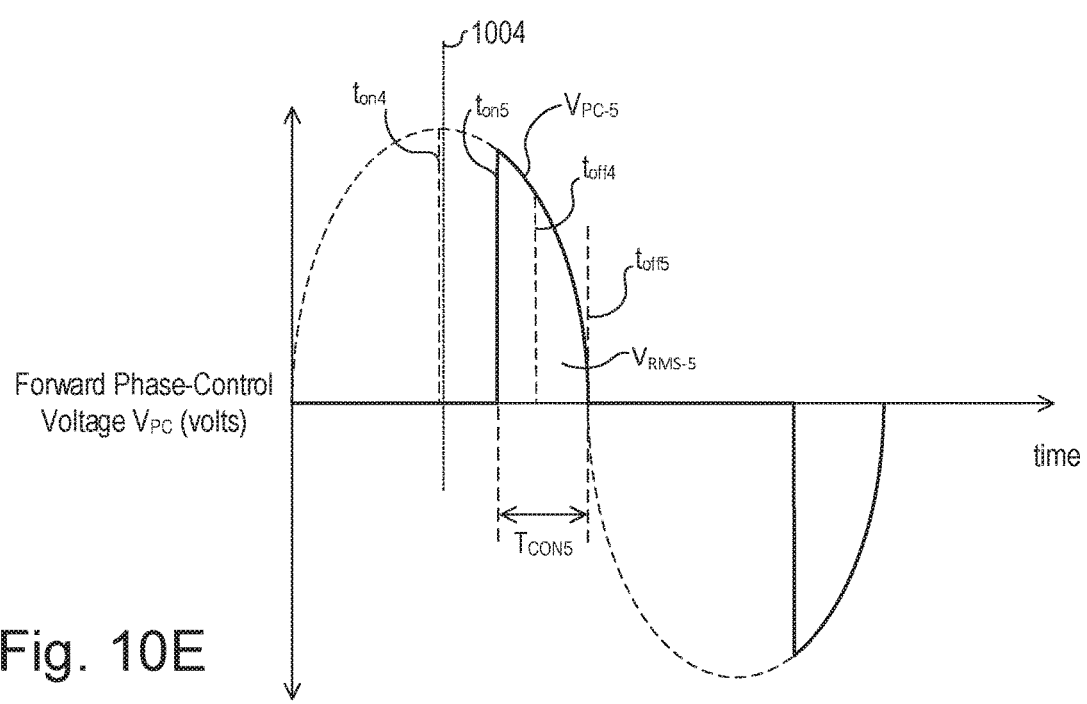

FIGS. 10A-10E are diagrams illustrating waveforms of an example dimming procedure. FIG. 10A is a diagram illustrating a waveform of a phase-control voltage $V_{PC-1}$ operating according to a reverse phase-control mode. FIG. 10B is a diagram illustrating a waveform of a phase-control voltage $V_{PC-2}$ operating according to an off-center phase-control mode. FIG. 10C is a diagram illustrating a waveform of a phase-control voltage $V_{PC-3}$ operating according to an on-center phase-control mode. FIG. 10D is a diagram illustrating a waveform of a phase-control voltage $V_{PC-4}$ operating according to an off-center phase-control mode. FIG. 10E is a diagram illustrating a waveform of a phase-control voltage $V_{PC-5}$ operating according to a forward phase-control mode.

A phase-control signal according to the example dimming procedure may comprise a first line cycle as represented by the phase-control voltage $V_{PC-1}$ of FIG. 10A, a second line cycle as represented by the phase-control voltage $V_{PC-2}$ of FIG. 10B, a third line cycle as represented by the phase-control voltage $V_{PC-3}$ of FIG. 10C, a fourth line cycle as represented by the phase-control voltage $V_{PC-4}$ of FIG. 10D, and a fifth line cycle as represented by the phase-control voltage $V_{PC-5}$ of FIG. 10E, for example, in the order as described. The example dimming procedure of FIGS. 10A-10E may be performed by a load control device (e.g., load control device 800), and may be performed in response to receiving a command to transition from an electronic off state (e.g., when the load control device 800 is powered, but a load is off) to an electronic on state. A phase-control signal may comprise none or any number of the phase control voltages $V_{PC-1}$-$V_{PC-5}$. A phase control voltage may comprise additional phase control voltages. For example, a phase control voltage may comprise a plurality of AC line cycles operating in forward phase control mode after providing phase-control voltage $V_{PC-5}$ to a load.

Referring to FIG. 10A, a phase control signal operating in reverse phase control mode is illustrated. The phase control signal of FIG. 10A may be characterized by the phase-control voltage $V_{PC-1}$. The phase control signal of FIG. 10A may be referred herein as the phase-control voltage $V_{PC-1}$. The phase-control voltage $V_{PC-1}$ may be characterized by a turn-on time $t_{on1}$ and a turn-off time $t_{off1}$. The turn-on time (turn-on event) $t_{on1}$ may occur at, or substantially at, a zero crossing of a positive half-line cycle of the AC line voltage. For example, the turn-on time $t_{on1}$ may be substantially at the zero crossing of the positive half-line cycle of the AC line voltage when low-end (e.g., lowest 1-5%) and/or high-end portions (e.g., highest 1-5%) of the half-cycle of the AC line voltage are not utilized, for example, in some load control devices utilized for dimming lighting loads. The turn-off time $t_{off1}$ may occur during the positive half-line cycle of the AC-line voltage and before the negative zero-crossing of the AC-line voltage. For example, the turn-off time $t_{off1}$ of the phase-control voltage $V_{PC-1}$ may be before (e.g., as shown in FIG. 10A), at, or after a midpoint 1000 of the positive half-cycle of AC-line voltage.

The phase-control voltage $V_{PC-1}$ may be characterized by a conduction time $T_{CON1}$. The conduction time $T_{CON1}$ may correspond to the time within the positive half-cycle of the AC-line voltage when the load control device is providing voltage to the load. For example, the conduction time $T_{CON1}$ may correspond to the time when a bidirectional semiconductor switch of the load control device is rendered conductive. The phase-control voltage $V_{PC-1}$ may be characterized by a RMS voltage value $V_{RMS-1}$. The RMS voltage value $V_{RMS-1}$ may correspond to the magnitude of RMS voltage provided by the positive half-cycle of the AC-line voltage during the conduction time $T_{CON1}$.

Referring to FIG. 10B, a phase control signal operating in off-center phase control mode is illustrated. The phase control signal of FIG. 10B may be characterized by the phase-control voltage $V_{PC-2}$. The phase control signal of FIG. 10B may be referred herein as the phase-control voltage $V_{PC-2}$. The phase-control voltage $V_{PC-2}$ may be characterized by a turn-on time $t_{on2}$ and a turn-off time $t_{off2}$. The turn-on time $t_{on2}$ may occur after a zero crossing of a positive half-line cycle of the AC line voltage, and before (e.g., as shown in FIG. 10B) or after a midpoint 1001 of the positive half-line cycle of the AC line voltage. The turn-off time $t_{off2}$ may occur during the positive half-line cycle of the AC-line voltage and before the negative zero-crossing of the AC-line voltage. For example, the turn-off time $t_{off2}$ of the phase-control voltage $V_{PC-2}$ may occur before, at, or after (e.g., as shown in FIG. 10B) the midpoint 1001 of the positive half-cycle of AC-line voltage.

With respect to a positive half-line cycle of AC-line voltage, the turn-on time $t_{on2}$ of the phase-control voltage $V_{PC-2}$ may occur after the turn-on time $t_{on1}$ of the phase-control voltage $V_{PC-1}$ of FIG. 10A, but may occur before the turn-off time $t_{off1}$ of the phase-control voltage $V_{PC-1}$ of FIG. 10A. Therefore, the phase-control voltage $V_{PC-2}$ of FIG. 10B may be said to overlap the phase-control voltage $V_{PC-1}$ of FIG. 10A even though they may occur at different times and in different line-cycles of the AC-line voltage. However, the phase-control voltage $V_{PC-2}$ of FIG. 10B may not overlap the phase-control voltage $V_{PC-1}$ of FIG. 10A.

The phase-control voltage $V_{PC-2}$ may be characterized by a conduction time $T_{CON2}$. The conduction time $T_{CON2}$ may correspond to the time within the positive half-cycle of the AC-line voltage when the load control device is providing voltage to the load. For example, the conduction time $T_{CON2}$ may correspond to the time when a bidirectional semiconductor switch of the load control device is rendered conductive. The phase-control voltage $V_{PC-2}$ may be characterized by a RMS voltage value $V_{RMS-2}$. The RMS voltage value $V_{RMS-2}$ may correspond to the magnitude of RMS voltage provided by the positive half-cycle of the AC-line voltage during the conduction time $T_{CON2}$.

The phase-control voltage $V_{PC-2}$ may be characterized as a phase control signal operating in an off-center phase control mode because the phase-control voltage $V_{PC-2}$ may comprise (e.g., overlap) the midpoint 1001 of the positive half-line cycle of AC-line voltage, but the midpoint 1001 of the positive half-line cycle AC-line voltage may not substantially correspond to the halfway point of the conduction time $T_{CON2}$ (e.g., such an instance may be considered an on-center phase control signal, for example, as described with reference to FIG. 10C). However, a phase control signal operating in an off-center phase control mode may not comprise the midpoint 1001 of the positive half-line cycle of the AC line voltage at all. For example, a phase control signal operating in an off-center phase control mode may be characterized by a turn-on time that is after the zero-crossing of a positive half-line cycle of the AC line voltage as the AC line voltage goes from positive to negative, and a turn-off time that is before the midpoint 1001. A phase control signal operating in an off-center phase control mode may be characterized by a turn-on time that is after the zero-crossing of the AC line voltage as the AC line voltage goes from positive to negative (e.g., and after the turn-on time of reverse phase control signal), and a turn-off time that is before next zero-crossing of the AC line voltage as the AC line voltage goes from negative to positive. A phase control signal operating in an off-center phase control mode is not a forward phase control signal, a reverse phase control signal, or a full conduction control signal.

Referring to FIG. 10C, a phase control signal operating in an on-center phase control mode is illustrated. The phase control signal of FIG. 10C may be characterized by the phase-control voltage $V_{PC-3}$. The phase control signal of FIG. 10C may be referred herein as the phase-control voltage $V_{PC-3}$. The phase-control voltage $V_{PC-3}$ may be characterized by a turn-on time $t_{on3}$ and a turn-off time $t_{off3}$. The turn-on time $t_{on3}$ may occur after a zero crossing of a positive half-line cycle of the AC line voltage but before a midpoint 1002 of the positive half-line cycle of the AC line voltage. The turn-off time $t_{off3}$ may occur after the midpoint and during the positive half-line cycle of the AC-line voltage, but before the negative zero-crossing of the AC-line voltage.

With respect to a positive half-line cycle of AC-line voltage, the turn-on time $t_{on3}$ of the phase-control voltage $V_{PC-3}$ may occur after the turn-on time $t_{on2}$ of the phase-control voltage $V_{PC-2}$ of FIG. 10B, but may occur before the turn-off time $t_{off2}$ of the phase-control voltage $V_{PC-2}$ of FIG. 10B. Therefore, the phase-control voltage $V_{PC-3}$ of FIG. 10C may be said to overlap the phase-control voltage $V_{PC-2}$ of FIG. 10B even though they may occur at different times and in different line-cycles of the AC-line voltage. However, the phase-control voltage $V_{PC-3}$ of FIG. 10C may not overlap the phase-control voltage $V_{PC-2}$ of FIG. 10B.

The phase-control voltage $V_{PC-3}$ may be characterized by a conduction time $T_{CON3}$. The conduction time $T_{CON3}$ may correspond to the time within the positive half-cycle of the AC-line voltage when the load control device is providing voltage to the load. For example, the conduction time $T_{CON3}$ may correspond to the time when a bidirectional semiconductor switch of the load control device is rendered conductive. The phase-control voltage $V_{PC-3}$ may be characterized by a RMS voltage value $V_{RMS-3}$. The RMS voltage value $V_{RMS-3}$ may correspond to the magnitude of RMS voltage provided by the positive half-cycle of the AC-line voltage during the conduction time $T_{CON3}$.

The phase-control signal of FIG. 10C may be characterized as operating in an on-center phase control mode because the phase-control voltage $V_{PC-3}$ comprises (e.g., overlaps) the midpoint 1002 of the positive half-line cycle of AC-line voltage and the midpoint 1002 of the positive half-line cycle AC-line voltage substantially corresponds to the halfway point of the conduction time $T_{CON3}$. Therefore, approximately an equal portion of the conduction time $T_{CON3}$ occurs before the midpoint 1002 as occurs after the midpoint 1002. A phase control signal operating in an on-center phase control mode may be characterized by a turn-on time that is after the zero-crossing of the AC line voltage as the AC line voltage goes from positive to negative and before the midpoint of a half-line cycle of the AC line voltage, and a turn-off time that is after the midpoint of the half-line cycle of the AC line voltage and before next zero-crossing of the AC line voltage as the AC line voltage goes from negative to positive, and where the midpoint substantially corresponds to the halfway point of the conduction time of the phase control signal. A phase control signal operating in an on-center phase control mode is not a forward phase control signal, a reverse phase control signal, or a full conduction control signal.

Referring to FIG. 10D, a phase control signal operating in off-center phase control mode is illustrated. The phase control signal of FIG. 10D may be characterized by the phase-control voltage $V_{PC-4}$. The phase control signal of FIG. 10D may be referred herein as the phase-control voltage $V_{PC\text{-}4}$. The phase-control voltage $V_{PC\text{-}4}$ may be characterized by a turn-on time $t_{on4}$ and a turn-off time $t_{off4}$. The turn-on time $t_{on4}$ may occur after a zero crossing of a positive half-line cycle of the AC line voltage, and before (e.g., as shown in FIG. 10D) or after a midpoint 1003 of the positive half-line cycle of the AC line voltage. The turn-off time $t_{off4}$ may occur during the positive half-line cycle of the AC-line voltage and before the negative zero-crossing of the AC-line voltage. For example, the turn-off time $t_{off4}$ of the phase-control voltage $V_{PC\text{-}4}$ may occur before, at, or after (e.g., as shown in FIG. 10D) the midpoint 1003 of the positive half-cycle of AC-line voltage.

With respect to a positive half-line cycle of AC-line voltage, the turn-on time $t_{on4}$ of the phase-control voltage $V_{PC\text{-}4}$ may occur after the turn-on time $t_{on3}$ of the phase-control voltage $V_{PC\text{-}3}$ of FIG. 10C, but may occur before the turn-off time $t_{off3}$ of the phase-control voltage $V_{PC\text{-}3}$ of FIG. 10C. Therefore, the phase-control voltage $V_{PC\text{-}4}$ of FIG. 10D may be said to overlap the phase-control voltage $V_{PC\text{-}3}$ of FIG. 10C even though they may occur at different times and in different line-cycles of the AC-line voltage. However, the phase-control voltage $V_{PC\text{-}4}$ of FIG. 10D may not overlap the phase-control voltage $V_{PC\text{-}3}$ of FIG. 10C.

The phase-control voltage $V_{PC\text{-}4}$ may be characterized by a conduction time $T_{CON4}$. The conduction time $T_{CON4}$ may correspond to the time within the positive half-cycle of the AC-line voltage when the load control device is providing voltage to the load. For example, the conduction time $T_{CON4}$ may correspond to the time when a bidirectional semiconductor switch of the load control device is rendered conductive. The phase-control voltage $V_{PC\text{-}4}$ may be characterized by a RMS voltage value $V_{RMS\text{-}4}$. The RMS voltage value $V_{RMS\text{-}4}$ may correspond to the magnitude of RMS voltage provided by the positive half-cycle of the AC-line voltage.

The phase-control signal of FIG. 10D may be characterized as operating in an off-center phase control mode because the phase-control voltage $V_{PC\text{-}4}$ comprises (e.g., overlaps) the midpoint 1003 of the positive half-line cycle of AC-line voltage, but the midpoint 1003 of the positive half-line cycle AC-line voltage does not substantially correspond to the halfway point of the conduction time $T_{CON4}$. The phase-control signal of FIG. 10D may be similar to the phase-control signal of FIG. 10B with the exception that the majority of the conduction time $T_{CON4}$ of the phase-control signal of FIG. 10D is after the midpoint 1003 of the positive half-line cycle AC-line voltage, while the majority of the conduction time $T_{CON2}$ of the phase-control signal of FIG. 10B is before the midpoint 1001 of the positive half-line cycle AC-line voltage.

Referring to FIG. 10E, a phase control signal operating in forward phase control mode is illustrated. The phase control signal of FIG. 10E may be characterized by the phase-control voltage $V_{PC\text{-}5}$. The phase control signal of FIG. 10E may be referred herein as the phase-control voltage $V_{PC\text{-}5}$. The phase-control voltage $V_{PC}$-may be characterized by a turn-on time $t_{on5}$ and a turn-off time $t_{off5}$. The turn-on time $t_{on5}$ may occur after a zero crossing of a positive half-line cycle of the AC line voltage. The turn-on time $t_{on5}$ may occur before, at, or after (e.g., as shown in FIG. 10E) a midpoint 1004 of the positive half-line cycle of the AC line voltage. The turn-off time $t_{off5}$ may occur at, or substantially at, a zero crossing of the AC line voltage as the AC line voltage goes from the positive half-line cycle to the negative half-line cycle. For example, the turn-off time $t_{off5}$ may be substantially at the zero crossing of the AC line voltage when low-end (e.g., lowest 1-5%) and/or high-end portions (e.g., highest 1-5%) of the half-cycle of the AC line voltage are not utilized, for example, in some load control devices utilized for dimming lighting loads.

With respect to a positive half-line cycle of AC-line voltage, the turn-on time $t_{on5}$ of the phase-control voltage $V_{PC\text{-}5}$ may occur after the turn-on time $t_{on4}$ of the phase-control voltage $V_{PC\text{-}4}$ of FIG. 10D, but may occur before the turn-off time $t_{off4}$ of the phase-control voltage $V_{PC\text{-}4}$ of FIG. 10D. Therefore, the phase-control voltage $V_{PC\text{-}5}$ of FIG. 10E may be said to overlap the phase-control voltage $V_{PC\text{-}4}$ of FIG. 10D even though they may occur at different times and in different line-cycles of the AC-line voltage. However, the phase-control voltage $V_{PC\text{-}5}$ of FIG. 10E may not overlap the phase-control voltage $V_{PC\text{-}4}$ of FIG. 10D.

The phase-control voltage $V_{PC\text{-}5}$ may be characterized by a conduction time $T_{CON5}$. The conduction time $T_{CON5}$ may correspond to the time within the positive half-cycle of the AC-line voltage when the load control device is providing voltage to the load. For example, the conduction time $T_{CON5}$ may correspond to the time when a bidirectional semiconductor switch of the load control device is rendered conductive. The phase-control voltage $V_{PC\text{-}5}$ may be characterized by a RMS voltage value $V_{RMS\text{-}5}$. The RMS voltage value $V_{RMS\text{-}5}$ may correspond to the magnitude of RMS voltage provided by the positive half-cycle of the AC-line voltage.

Two or more of the conduction times $T_{CON1}$, $T_{CON2}$, $T_{CON3}$, $T_{CON4}$, and $T_{CON5}$ may be the same. For example, all of the conduction times $T_{CON1}$, $T_{CON2}$, $T_{CON3}$, $T_{CON4}$, and $T_{CON5}$ may be the same. Two or more of the conduction times $T_{CON1}$, $T_{CON2}$, $T_{CON3}$, $T_{CON4}$, and $T_{CON5}$ may be different. For example, all of the conduction times $T_{CON1}$, $T_{CON2}$, $T_{CON3}$, $T_{CON4}$, and $T_{CON5}$ may be different.

Two or more of the RMS voltage values $V_{RMS\text{-}1}$, $V_{RMS\text{-}2}$, $V_{RMS\text{-}3}$, $V_{RMS\text{-}4}$, and $V_{RMS\text{-}5}$ may be the same. For example, all of the RMS voltage values $V_{RMS\text{-}1}$, $V_{RMS\text{-}2}$, $V_{RMS\text{-}3}$, $V_{RMS\text{-}4}$, and $V_{RMS\text{-}5}$ may be the same. Two or more of the RMS voltage values $V_{RMS\text{-}1}$, $V_{RMS\text{-}2}$, $V_{RMS\text{-}3}$, $V_{RMS\text{-}4}$, and $V_{RMS\text{-}5}$ may be different. For example, all of the RMS voltage values $V_{RMS\text{-}1}$, $V_{RMS\text{-}2}$, $V_{RMS\text{-}3}$, $V_{RMS\text{-}4}$, and $V_{RMS\text{-}5}$ may be different.

The turn-on event (turn-on time) of a line-cycle of each successive phase-control signal may be equal to or greater than (e.g., later in time relative to the most recent zero-crossing) the turn-on event of the previous line-cycle of the phase-control signal. For example, as described with reference to FIGS. 10A-10E, the turn-on event $t_{on2}$ of the phase-control signal of FIG. 10B may be greater than the turn-on event $t_{on1}$ of the phase-control signal of FIG. 10A. The turn-on event $t_{on3}$ of the phase-control signal of FIG. 10C may be greater than the turn-on event $t_{on2}$ of the phase-control signal of FIG. 10B. The turn-on event $t_{on4}$ of the phase-control signal of FIG. 10D may be greater than the turn-on event $t_{on3}$ of the phase-control signal of FIG. 10C. The turn-on event $t_{on5}$ of the phase-control signal of FIG. 10E may be greater than the turn-on event $t_{on4}$ of the phase-control signal of FIG. 10D.

The firing angle of a phase-control signal operating in a forward phase-control mode may refer to a turn-on event, for example. The firing angle of a phase-control signal operating in a reverse phase-control mode may refer to a turn-off event, for example. The firing angle of a phase-control signal operating in a center phase-control mode may refer to a turn-on event and/or a turn-off event, for example.

The phase control signal of FIGS. 10A-10E may comprise corresponding negative half-line cycles of the AC-line voltage that is symmetrical to the positive half-line cycles of the AC-line voltage. Therefore, although described with reference to the positive half-line cycles of the AC-line voltage, the description of the negative half-line cycles of the phase control signals of FIGS. 10A-10E may be similarly characterized as the positive half-line cycles. However, the phase control signals of FIGS. 10A-10B may comprise corresponding negative half-line cycles of the AC-line voltage that is not symmetrical to the positive half-line cycles of the AC-line voltage.

Using a phase-control signal operating in a center phase control mode, such as an off-center phase control mode or an on-center phase control mode, for example, may allow a load control device to operate (e.g., dim) a variety of different loads (e.g., incandescent load, LED lamp, CFL load, etc.) under stable operating conditions. Some load types, such as LED and CFL loads, for example, may require a bus capacitor to be charged to operate properly. If the bus capacitor is not charged, then a current spike may result, which may, for example, damage a component of the load. The bus capacitor may be charged using the peak voltages of the phase control signal. However, some load types, such as incandescent lamps, for example, may exhibit instability during dimming if an RMS voltage value exceeding a threshold is provided to the load. For example, an incandescent lamp may flash on if an RMS voltage value exceeding the threshold is provide to the load. Therefore, using a phase-control signal operating in a center phase control mode may allow the load control device to provide peak voltages to the load to charge a bus capacitor of the load (e.g., as quickly as possible), while still limiting the total RMS voltage provided to the load. Thus, using a phase-control signal operating in a center phase control mode may allow the load control device operate (e.g., dim) a variety of different loads under more stable operating conditions, for example, by charging a bus capacitor of the load and limiting the total RMS voltage provided to the load.

An electrical load, such as an LED lamp, for example, may require a certain minimum voltage across it in order to turn on (e.g., emit light). Once turned on, the load may be able to operate with an even lower voltage (e.g., and thus provide a lower light intensity) than is required to turn the lamp on. A load control device may utilize a phase-control signal operating in a reverse phase-control mode, a center phase-control mode, and a forward phase-control mode in a single operation, for example, to charge a bus capacitor of the load, provide sufficient voltage across the load to turn it on, and operate the load while allowing it to reach its lowest possible light output (low-end).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A load control device for controlling an amount of power delivered from an alternating current (AC) power source to an electrical load, the load control device comprising:
a bidirectional semiconductor switch configured to be coupled between the AC power source and the electrical load; and
a controller operatively coupled to the bidirectional semiconductor switch, the controller configured to:
receive, via an actuator or a communication circuit, a command to turn on;
control the bidirectional semiconductor switch to provide a phase control signal using a reverse phase control technique to control the electrical load in response to the command to turn on;
subsequent to using the reverse phase control technique, control the bidirectional semiconductor switch using a center phase control technique to control the electrical load; and
subsequent using the center phase control technique, control the bidirectional semiconductor switch using a forward phase control technique to control the electrical load.

2. The load control device of claim 1, wherein a line cycle of each of the reverse, center, and forward phase control techniques have a same conduction time.

3. The load control device of claim 1, wherein a line cycle of each of the reverse, center, and forward phase control techniques have a same RMS voltage value.

4. The load control device of claim 1, wherein a conduction time of a line cycle of the phase control signal using the center phase control technique does not overlap a midpoint of a half-cycle of the line cycle.

5. The load control device of claim 1, wherein a conduction time of a line cycle of the phase control signal using the center phase control technique overlaps a midpoint of a half-cycle of the line cycle.

6. The load control device of claim 5, wherein the conduction time of a line cycle of the phase control signal using the center phase control technique is centered about the midpoint of the half-cycle of the line cycle.

7. The load control device of claim 1, wherein the controller is further configured to:
provide a plurality of line cycles of the phase control signal using the center phase control technique to control the electrical load prior to using the forward phase control technique to control the electrical load.

8. The load control device of claim 7, wherein each of the plurality of line cycles of the phase control signal using the center phase control technique have a same conduction time.

9. The load control device of claim 7, wherein each of the plurality of line cycles of the phase control signal using the center phase control technique have a same RMS voltage value.

10. The load control device of claim 7, wherein each of the plurality of line cycles of the phase control signal using the center phase control technique are characterized by a turn-on event, the turn-on event of each of the plurality of line cycles of the phase control signal using the center phase control technique being different.

11. The load control device of claim 10, wherein the turn-on event of each of the plurality of line cycles of the phase control signal using the center phase control technique is greater than the turn-on event of a preceding line cycle of the phase control signal.

12. A method performed by a load control device for controlling an amount of power provided to a load, the load control device electrically coupled between an alternating-circuit (AC) power source and the load, the method comprising:
receiving, via an actuator or a communication circuit, a command to turn on;
providing a phase control signal using a reverse phase control technique to the electrical load in response to the command to turn on;
subsequent to using the reverse phase control technique, using a center phase control technique to the electrical load; and subsequent to using the center phase control technique, using a forward phase control technique to the electrical load.

13. The method of claim 12, wherein a line cycle of each of the reverse, center, and forward phase control techniques have a same conduction time.

14. The method of claim 12, wherein a line cycle of each of the reverse, center, and forward phase control techniques have a same RMS voltage value.

15. The method of claim 12, wherein a conduction time of a line cycle of the phase control signal using the center phase control technique does not overlap a midpoint of a half-cycle of the line cycle.

16. The method of claim 12, wherein a conduction time of a line cycle of the phase control signal using the center phase control technique overlaps a midpoint of a half-cycle of the line cycle.

17. The method of claim 16, wherein the conduction time of a line cycle of the phase control signal using the center phase control technique is centered about the midpoint of the half-cycle of the line cycle.

18. The method of claim 12, further comprising: prior to using the forward phase control technique to control the electrical load, providing a plurality of line cycles of the phase control signal using the center phase control technique to control the electrical load.

19. The method of claim 18, wherein each of the plurality of line cycles of the phase control signal using the center phase control technique have a same conduction time.

20. The method of claim 18, wherein each of the plurality of line cycles of the phase control signal using the center phase control technique have a same RMS voltage value.

21. The method of claim 18, wherein each of the plurality of line cycles of the phase control signal using the center phase control technique are characterized by a turn-on event, the turn-on event of each of the plurality of line cycles of the phase control signal using the center phase control technique being different.

22. The method of claim 21, wherein the turn-on event of each of the plurality of line cycles of the phase control signal using the center phase control technique is greater than the turn-on event of a preceding line cycle of the phase control signal.

23. A load control device configured to control an amount of power provided to an electrical load from an alternating-circuit (AC) power source, the electrical load having an on state and an off state, the load control device comprising:
- a bidirectional semiconductor switch configured to be coupled between the electrical load and the AC power source; and
- a processor operatively coupled to the bidirectional semiconductor switch and configured to control the bidirectional semiconductor switch using a phase control dimming technique to adjust the amount of power provided to the electrical load;
- wherein when the electrical load is in an off state, the processor is configured to:
   - receive, via an actuator or a communication circuit, a command to turn on;
   - in response to the command to turn on, use a reverse phase control dimming technique for a predetermined period of time to control the electrical load to be in the on state and to charge a bus capacitor; and
   - after the predetermined period of time,
   - subsequently use a forward phase control dimming technique to continue to maintain the electrical load in the on state.

* * * * *